United States Patent
Hashimoto et al.

(10) Patent No.: US 11,050,613 B2
(45) Date of Patent: *Jun. 29, 2021

(54) GENERATING CONFIGURATION FILES FOR CONFIGURING AN INFORMATION TECHNOLOGY INFRASTRUCTURE

(71) Applicant: HashiCorp, San Francisco, CA (US)

(72) Inventors: Mitchell Hashimoto, Los Angeles, CA (US); Armon Dadgar, San Francisco, CA (US); Paul Hinze, Chicago, IL (US)

(73) Assignee: HASHICORP, San Francisco, CA (US)

(*) Notice: Subject to any disclaimer, the term of this patent is extended or adjusted under 35 U.S.C. 154(b) by 124 days.

This patent is subject to a terminal disclaimer.

(21) Appl. No.: 16/503,422

(22) Filed: Jul. 3, 2019

(65) Prior Publication Data

US 2020/0186416 A1   Jun. 11, 2020

Related U.S. Application Data

(63) Continuation-in-part of application No. 16/391,258, filed on Apr. 22, 2019.
(Continued)

(51) Int. Cl.
*G06F 9/445* (2018.01)
*H04L 12/24* (2006.01)
(Continued)

(52) U.S. Cl.
CPC ........ *H04L 41/0803* (2013.01); *G06F 3/0481* (2013.01); *G06F 3/0484* (2013.01); *G06F 9/451* (2018.02); *H04L 41/22* (2013.01)

(58) Field of Classification Search
CPC ............. H04L 41/0866; H04L 41/0893; H04L 41/0803; G06F 8/71; G06F 9/453; G06F 9/44505
See application file for complete search history.

(56) References Cited

U.S. PATENT DOCUMENTS

| | | | |
|---|---|---|---|
| 7,512,965 B1* | 3/2009 | Amdur | H04L 63/20 726/1 |
| 7,865,578 B1* | 1/2011 | Gerraty | H04L 12/40013 709/220 |

(Continued)

OTHER PUBLICATIONS

Non-Final Office Action for U.S. Appl. No. 16/391,227, filed Mar. 16, 2020, 30 pages.
(Continued)

*Primary Examiner* — Benjamin C Wu

(74) *Attorney, Agent, or Firm* — Kilpatrick Townsend & Stockton LLP

(57) ABSTRACT

A method for generating a configuration file for configuring an information technology infrastructure is provided. The method may include receiving, from a first user at a first client, a first indication to publish an infrastructure module comprising a set of configurations to apply to an information technology infrastructure. The infrastructure module may be stored in a module registry in response to the first indication. A second indication selecting the infrastructure module may be received from a second user at a second client. In response to the second indication, the infrastructure module may be sent from the module registry to the second client for insertion into a configuration file being created at the second client. The insertion of the infrastructure module may incorporate, into configuration file, the set of configurations to apply to the information technology infrastructure. Related systems and articles of manufacture, including computer program products, are also provided.

27 Claims, 27 Drawing Sheets

Related U.S. Application Data

(60) Provisional application No. 62/776,433, filed on Dec. 6, 2018, provisional application No. 62/776,434, filed on Dec. 6, 2018, provisional application No. 62/776,437, filed on Dec. 6, 2018.

(51) Int. Cl.
*G06F 9/451* (2018.01)
*G06F 3/0481* (2013.01)
*G06F 3/0484* (2013.01)

(56) References Cited

U.S. PATENT DOCUMENTS

| | | | |
|---|---|---|---|
| 9,003,406 B1 | 4/2015 | Hodge et al. | |
| 9,992,064 B1 * | 6/2018 | Chawla | H04L 41/0866 |
| 10,200,246 B1 | 2/2019 | Rachamadugu | |
| 10,318,285 B1 | 6/2019 | Jodoin et al. | |
| 10,417,013 B1 * | 9/2019 | Anderson | H04L 41/0806 |
| 10,469,330 B1 * | 11/2019 | Roth | H04L 41/22 |
| 10,778,539 B1 * | 9/2020 | Hussain | H04L 41/22 |
| 2005/0262194 A1 * | 11/2005 | Mamou | G06Q 10/10 709/203 |
| 2006/0069717 A1 * | 3/2006 | Mamou | G16H 10/60 709/203 |
| 2006/0245354 A1 | 11/2006 | Gao et al. | |
| 2008/0004922 A1 * | 1/2008 | Eder | G06Q 30/0202 705/7.31 |
| 2008/0071588 A1 * | 3/2008 | Eder | G06Q 10/06 705/7.31 |
| 2009/0150887 A1 | 6/2009 | Sanghvi et al. | |
| 2009/0222540 A1 * | 9/2009 | Mishra | H04L 41/085 709/222 |
| 2010/0161805 A1 | 6/2010 | Yoshizawa et al. | |
| 2011/0022694 A1 * | 1/2011 | Dalal | H04L 41/0856 709/222 |
| 2013/0191543 A1 | 7/2013 | Abbondanzio et al. | |
| 2013/0232463 A1 | 9/2013 | Nagaraja et al. | |
| 2014/0365662 A1 * | 12/2014 | Dave | G06Q 30/02 709/226 |
| 2015/0334696 A1 * | 11/2015 | Gu | H04L 61/2015 718/1 |
| 2015/0341230 A1 * | 11/2015 | Dave | H04L 41/5051 705/7.29 |
| 2017/0004018 A1 | 1/2017 | Mangtani et al. | |
| 2017/0034023 A1 | 2/2017 | Nickolov et al. | |
| 2017/0237679 A1 * | 8/2017 | Kumar | H04L 47/70 709/226 |
| 2017/0272321 A1 * | 9/2017 | Ramos da Rocha | H04L 41/0816 |
| 2018/0165122 A1 * | 6/2018 | Dobrev | G06F 9/45558 |
| 2018/0210707 A1 * | 7/2018 | Stallmann | H04L 41/0893 |
| 2019/0065221 A1 * | 2/2019 | Chauhan | H04L 67/34 |
| 2019/0068445 A1 * | 2/2019 | Chauhan | H04L 41/5051 |
| 2019/0079751 A1 | 3/2019 | Foskett et al. | |
| 2019/0294477 A1 | 9/2019 | Koppes et al. | |
| 2019/0327144 A1 | 10/2019 | Tembey et al. | |
| 2020/0004529 A1 | 1/2020 | Ravipati et al. | |

OTHER PUBLICATIONS

Non-Final Office Action U.S. Appl. No. 16/503,420, filed May 8, 2020, 30 pages.
Final Office Action U.S. Appl. No. 16/391,227, filed Jun. 11, 2020, 37 pages.
Non-Final Office Action for U.S. Appl. No. 16/503,421 dated Jul. 9, 2020, 18 pages.
Non-Final Office Action for U.S. Appl. No. 16/391,255, dated Jan. 1, 2021, 23 pages.
Non-Final Office Action for U.S. Appl. No. 16/391,227, dated Jan. 28, 2021, 36 pages.
Advisory Action for U.S. Appl. No. 16/391,227, dated Nov. 19, 2020, 4 pages.

* cited by examiner

Settings

○ Auto apply

Automatically apply changes when a Terraform plan is successful. Plans that have no changes will not be applied. If this workspace is linked to version control, a push to the default branch of the linked repository will trigger a plan and apply.

● Manual apply

Require an operator to confirm the result of the Terraform plan before applying. If this workspace is linked to version control, a push to the default branch of the linked repository will only trigger a plan and then wait for confirmation.

TERRAFORM VERSION 0.11.7

The version of Terraform to use for this workspace. Upon creating this workspace, the latest version was selected and will be used until it is changed manually. It will not upgrade automatically.

[ Save settings ] ← 3340

FIG. 4K

GENERATING CONFIGURATION FILES FOR CONFIGURING AN INFORMATION TECHNOLOGY INFRASTRUCTURE

CROSS REFERENCE TO RELATED APPLICATIONS

This application is a continuation-in-part of U.S. application Ser. No. 16/391,258, filed on Apr. 22, 2019 and entitled "GENERATING CONFIGURATION FILES FOR CONFIGURING AN INFORMATION TECHNOLOGY INFRASTRUCTURE," which claims priority to U.S. Provisional Application No. 62/776,433, filed on Dec. 6, 2018 and entitled "LIFECYCLE MANAGEMENT FOR INFORMATION TECHNOLOGY INFRASTRUCTURE," U.S. Provisional Application No. 62/776,434, filed on Dec. 6, 2018 and entitled "VALIDATION OF EXECUTION PLAN FOR CONFIGURING AN INFORMATION TECHNOLOGY INFRASTRUCTURE," and U.S. Provisional Application No. 62/776,437, filed on Dec. 6, 2018 and entitled "GENERATING CONFIGURATION FILES FOR CONFIGURING AN INFORMATION TECHNOLOGY INFRASTRUCTURE," the disclosures of which are incorporated herein by references in their entirety.

TECHNICAL FIELD

The present disclosure generally relates to information technology infrastructure and, more specifically, to lifecycle management for information technology infrastructure including the provisioning, modification, and/or de-provisioning of the underlying resources.

BACKGROUND

Information technology (IT) infrastructure may refer to the hardware resources, software resources, and/or network resources forming an enterprise's information technology environment. For example, hardware resources may include servers, computers, data centers, switches, hubs, routers, and/or the like. Meanwhile, software resources may include enterprise resource planning (ERP) software applications, customer relationship management (CRM) software applications, productivity software applications, and/or the like. The network resources of the enterprise's information technology infrastructure may include any resources providing network enablement, network connectivity, network security, and/or the like.

The information technology infrastructure of the enterprise may enable the delivery of information technology services and/or solutions to a variety of internal and external users including, for example, employees, partners, customers, and/or the like. For instance, the hardware resources of the enterprise's information technology infrastructure may be used to host the software resources. At least some of the software resources within the enterprise's information technology infrastructure may be available remotely, for example, as a software-as-a-service (SaaS), a web application, and/or the like. Remote access to these software resources may be enabled and/or regulated by the network resources within the enterprise's information technology infrastructure.

SUMMARY

Methods, systems, and articles of manufacture, including computer program products, are provided for managing information technology (IT) infrastructure. In some implementations of the current subject matter, there is provided a system. The system can include at least one data processor. The system can further include at least one memory storing instructions that result in operations when executed by the at least one data processor. The operations can include: receiving, from a first user at a first client, a first indication to publish a first infrastructure module, the first infrastructure module comprising a first set of configurations to apply to an information technology infrastructure; responding to the first indication by at least storing, in a module registry, the first infrastructure module; receiving, from a second user at a second client, a second indication selecting the first infrastructure module; and responding to the second indication by at least sending, from the module registry to the second client, the first infrastructure module for insertion into a configuration file being created at the second client, the insertion of the first infrastructure module incorporating, into configuration file, the first set of configurations to apply to the information technology infrastructure.

In some variations, one or more features disclosed herein including the following features may optionally be included in any feasible combination. A webhook may be registered at a version controller in response to the first indication. The webhook may be configured to post a notification in response to a first version of the first infrastructure module and/or a second version of the first infrastructure module being committed to the version controller. The first version of the first infrastructure module and/or the second version of the first infrastructure module may be pulled from the version controller in response to the notification.

In some variations, a user interface may be generated to display, at the second client, a selection of infrastructure modules for insertion into the configuration file. The selection of infrastructure modules may include the first infrastructure module. The selection of infrastructure modules may further include a second infrastructure module that comprises a second set of configurations to apply to the information technology infrastructure. The second user at the second client may interact with the user interface to merge, into a workspace, the configuration file including the first infrastructure module. The workspace may be configured to maintain a plurality of configurations to apply to the information technology infrastructure. The merging of the configuration file into the workspace may incorporate, into the plurality of configurations maintained by the workspace, the first set of configurations associated with the first infrastructure module. In response to the configuration file being merged into the workspace, a third indication of the first infrastructure module being used in the workspace may be sent to the first client.

In some variations, the selection of infrastructure modules may further include a first version of the first infrastructure module and a second version of the first infrastructure module. The second indication from the second user may further select the first version of the first infrastructure module or the second version of the first infrastructure module for insertion into the configuration file.

In some variations, a third indication selecting the second infrastructure module may be receive from the second user at the second client. In response to the third indication, the second infrastructure module may be sent to the second client for insertion into the configuration file being created at the second client. The insertion of the second infrastructure module may incorporate, into configuration file, the second set of configurations to apply to the information technology infrastructure.

In some variations, the configuration file may include a programming code-based representation of one or more resources at the information technology infrastructure.

In some variations, applying the first set of configurations at the information technology infrastructure may include provisioning, modifying, and/or de-provisioning one or more resources at the information technology infrastructure.

In some variations, applying the first set of configurations at the information technology infrastructure may at least a partially achieves a predefined information technology objective comprising one or more of support for a software application, a multi-tier software application, self-service clusters, a software demonstration, a disposable environment, software defined networking, a resource scheduler, and/or a multi-cloud deployment.

In some variations, the module registry may be associated with an organization. The module registry may be accessible to the first user and the second user based at least on the first user and the second user being associated with the organization.

In some variations, the module registry may be accessible to the first user but not the second user based at least on a role and/or a permission associated with each of the first user and/or the second user.

In another aspect, there is provided a computer-implemented method for managing information technology (IT) infrastructure. The method can include: receiving, from a first user at a first client, a first indication to publish a first infrastructure module, the first infrastructure module comprising a first set of configurations to apply to an information technology infrastructure; responding to the first indication by at least storing, in a module registry, the first infrastructure module; receiving, from a second user at a second client, a second indication selecting the first infrastructure module; and responding to the second indication by at least sending, from the module registry to the second client, the first infrastructure module for insertion into a configuration file being created at the second client, the insertion of the first infrastructure module incorporating, into configuration file, the first set of configurations to apply to the information technology infrastructure.

In some variations, one or more features disclosed herein including the following features may optionally be included in any feasible combination. The method may further include responding to the first indication by registering, at a version controller, a webhook configured to post a notification in response to a first version of the first infrastructure module and/or a second version of the first infrastructure module being committed to the version controller. The first version of the first infrastructure module and/or the second version of the first infrastructure module may be pulled from the version controller in response to the notification.

In some variations, the method may further include generating a user interface configured to display, at the second client, a selection of infrastructure modules for insertion into the configuration file. The selection of infrastructure modules may include the first infrastructure module. The selection of infrastructure modules may further include a second infrastructure module that comprises a second set of configurations to apply to the information technology infrastructure. The second user at the second client may interact with the user interface to merge, into a workspace, the configuration file including the first infrastructure module. The workspace may be configured to maintain a plurality of configurations to apply to the information technology infrastructure. The merging of the configuration file into the workspace may incorporate, into the plurality of configurations maintained by the workspace, the first set of configurations associated with the first infrastructure module. In response to the configuration file being merged into the workspace, a third indication of the first infrastructure module being used in the workspace may be sent to the first client.

In some variations, the selection of infrastructure modules may further include a first version of the first infrastructure module and a second version of the first infrastructure module. The second indication from the second user may further select the first version of the first infrastructure module or the second version of the first infrastructure module for insertion into the configuration file.

In some variations, the method may further include: receiving, from the second user at the second client, a third indication selecting the second infrastructure module; and responding to the third indication by at least sending, to the second client, the second infrastructure module for insertion into the configuration file being created at the second client, the insertion of the second infrastructure module incorporating, into configuration file, the second set of configurations to apply to the information technology infrastructure.

In some variations, the configuration file may include a programming code-based representation of one or more resources at the information technology infrastructure.

In some variations, applying the first set of configurations at the information technology infrastructure may include provisioning, modifying, and/or de-provisioning one or more resources at the information technology infrastructure.

In some variations, applying the first set of configurations at the information technology infrastructure may at least a partially achieves a predefined information technology objective comprising one or more of support for a software application, a multi-tier software application, self-service clusters, a software demonstration, a disposable environment, software defined networking, a resource scheduler, and/or a multi-cloud deployment.

In some variations, the module registry may be associated with an organization. The module registry may be accessible to the first user and the second user based at least on the first user and the second user being associated with the organization.

In some variations, the module registry may be accessible to the first user but not the second user based at least on a role and/or a permission associated with each of the first user and/or the second user.

In another aspect, there is provided a non-transitory computer readable medium storing instructions. The instructions may be executed by at least one data processor to result in operations. The operations may include: receiving, from a first user at a first client, a first indication to publish a first infrastructure module, the first infrastructure module comprising a first set of configurations to apply to an information technology infrastructure; responding to the first indication by at least storing, in a module registry, the first infrastructure module; receiving, from a second user at a second client, a second indication selecting the first infrastructure module; and responding to the second indication by at least sending, from the module registry to the second client, the first infrastructure module for insertion into a configuration file being created at the second client, the insertion of the first infrastructure module incorporating, into configuration file, the first set of configurations to apply to the information technology infrastructure.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the management of information technology infrastructure, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4K depicts an example of a user interface for creating and configuring a workspace, in accordance with some example embodiments;

Figure 1A:
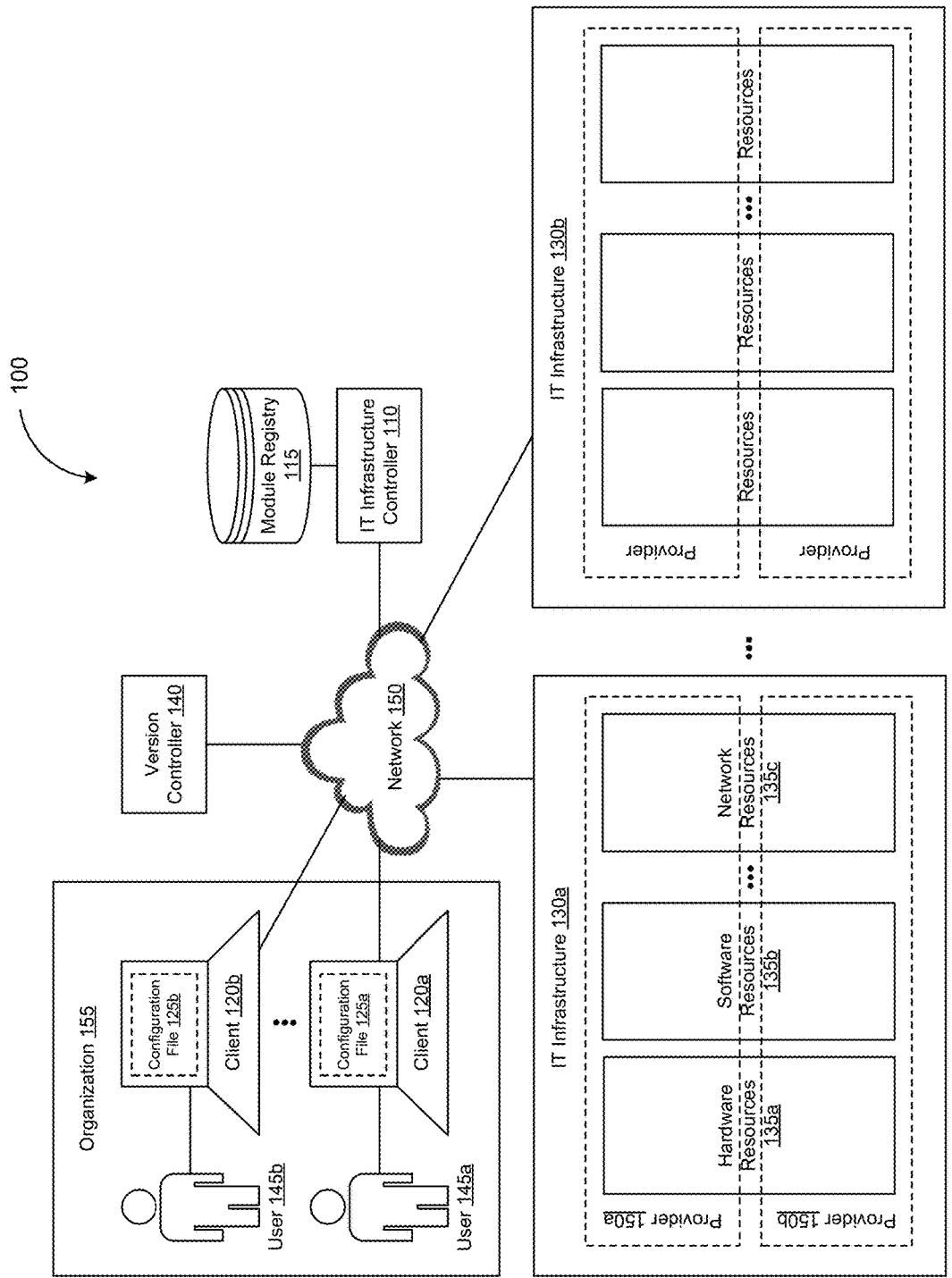
FIG. 1A depicts a system diagram illustrating an information technology infrastructure management system, in accordance with some example embodiments.

When practical, like labels are used to refer to same or similar items in the drawings.

DETAILED DESCRIPTION

The development of a software application may often be divorced from the subsequent deployment, testing, and maintenance of the software application. For instance, a software application may be developed in one environment by a team of software engineers before being deployed to another environment where the software application is tested and/or maintained by a separate team of information technology (IT) professionals. The absence of communication and collaboration between the software developers and the information technology professionals may result in the development and delivery of a software application that is difficult to deploy, test, and/or maintain.

Deploying the software application may require configuring an enterprise's information technology infrastructure to host the software application including, for example, by provisioning, modifying, and/or de-provisioning one or more hardware resources, software resources, network resources, and/or the like. It should be appreciated that the enterprise's information technology infrastructure may include private resources owned and operated by the enterprise for exclusive use by the enterprise. Alternatively and/or additionally, the enterprise's information technology infrastructure may include public resources owned and operated by a third party provider including, for example, an infrastructure-as-a-service (IaaS) provider, a platform-as-a-service (PaaS) provider, a software-as-a-service (SaaS) provider, and/or the like. Accordingly, the configuration of the enterprise's information technology infrastructure may include provisioning, modifying, and/or de-provisioning private resources and/or public resources to support the operations of the software application. Moreover, the enterprise's information technology infrastructure may require continuous monitoring and/or updates in order to ensure that the performance of the software application meets a threshold metric such as, for example, a service level objective (SLO) and/or the like.

In some example embodiments, an information technology (IT) infrastructure controller may be configured to provide lifecycle management for the information technology infrastructure of an enterprise. As noted, the information technology infrastructure of the enterprise may be configured to host a software application and/or ensure that the performance of the software application meets a threshold metric (e.g., a service level objective (SLO) and/or the like). For example, the enterprise's information technology infrastructure may be configured by at least provisioning, modifying, and/or de-provisioning one or more resources (e.g., hardware resources, software resources, network resources, and/or the like) within the information technology infrastructure in order to accommodate the deployment, testing, and/or maintenance of the software application. Accordingly, the information technology infrastructure controller may manage the provisioning, modification, and/or de-provisioning of the one or more resources engendered by the deployment, testing, and/or maintenance of the software application.

FIG. 1A depicts a system diagram illustrating an information technology (IT) infrastructure management system 100, in accordance with some example embodiments. Referring to FIG. 1A, the information technology infrastructure management system 100 may include an information technology infrastructure controller 110, a first client 120a, a second client 120b, and a version controller 140. Furthermore, the information technology infrastructure management system 100 may include one or more information technology infrastructures including, for example, a first information technology infrastructure 130a, a second information technology infrastructure 130b, and/or the like. As FIG. 1A shows, the information technology infrastructure controller 110, the first client 120a, the second client 120b, the first information technology infrastructure 130a, the second information technology infrastructure 130b, and/or the version controller 140 may be communicatively coupled via a network 150. The network 150 may be any wired and/or wireless network including, for example, a local area network (LAN), a wide area network (WAN), a public land mobile network (PLMN), the Internet, and/or the like.

Referring again to FIG. 1A, each of the first information technology infrastructure 130a and the second information technology infrastructure 130b may include a plurality of resources from one or more different providers including, for example, physical equipment, virtual machines, and/or the like. To further illustrate, FIG. 1A shows the first information technology infrastructure 130a as including, for example, hardware resources 135a, software resources 135b, network resources 135c, and/or the like. Moreover, FIG. 1A shows that the first information technology infrastructure 130a may include resources from multiple providers including, for example, a first provider 150a, a second provider 150b, and/or the like. For example, at least one of the first provider 150a and the second provider 150b may be a private provider such that at least a portion of the hardware resources 135a, the software resources 135b, and/or the network resources 135c are private resources owned and operated by an enterprise for exclusive use by the enterprise. Alternatively and/or additionally, at least one of the first provider 150a and/or the second provider 150b may be a third party provider including, for example, an infrastructure-as-a-service (IaaS) provider, a platform-as-a-service (PaaS) provider, a software-as-a-service (SaaS) provider, and/or the like. As such, at least a portion of the hardware resources 135a, the software resources 135b, and/or the network resources 135c may be public resources shared amongst multiple enterprises.

In some example embodiments, the information technology infrastructure controller 110 may be configured to provide lifecycle management for one or more information technology infrastructures including, for example, the first information technology infrastructure 130a, the second information technology infrastructure 130b, and/or the like. For example, the information technology infrastructure controller 110 may provide lifecycle management for the first information technology infrastructure 130a by at least managing the provisioning, modifying, and/or de-provisioning of one or more of the hardware resources 135a, the software resources 135b, and the network resources 135c. The provisioning, modifying, and/or de-provisioning of one or more of the hardware resources 135a, the software resources 135b, and the network resources 135c may be engendered by the deployment, testing, and/or maintenance of a software application.

In some example embodiments, the information technology infrastructure controller 110 may provision, modify, and/or de-provision one or more resources in the first information technology infrastructure 130a and/or the second information technology infrastructure 130b as part of configuring the first information technology infrastructure 130a and/or the second information technology infrastructure 130b to host the software application and/or to ensure that the performance of the software application meets a threshold metric (e.g., a service level objective (SLO) and/or the like). However, it should be appreciated that the first information technology infrastructure 130a and/or the second information technology infrastructure 130b may be configured and/or reconfigured to achieve any information technology objective including, for example, support for multi-tier software applications, self-service clusters, software demonstrations, disposable environments (e.g., production environments, staging environments, and/or the like), software defined networking, resource schedulers, multi-cloud deployment, and/or the like.

In some example embodiments, at least a portion of the first information technology infrastructure 130a and/or the second information technology infrastructure 130b may be configured using infrastructure as code (IaC). That is, instead of and/or in addition to physical hardware configuration, the first information technology infrastructure 130a and/or the second information technology infrastructure 130b may be configured via software using, for example, one or more configuration files specifying the configurations to apply to the first information technology infrastructure 130a and/or the second information technology infrastructure 130b as well as one or more corresponding variables. For instance, in order to support the deployment, testing, and/or maintenance of a software application at the first information technology infrastructure 130a, the first information technology infrastructure 130a may be configured based on a first configuration file 125a and/or a second configuration file 125b created respectively, for example, by a first user 145a at the first client 120a and a second user 145b at the second client 120b. As shown in FIG. 1A, the first user 145a at the first client 120a and the second user 145b at the second client 120b may be associated with a same organization, for example, an organization 155. However, it should be appreciated that the first user 145a at the first client 120a and the second user 145b at the second client 120b may be associated with different organizations.

The first configuration file 125a and the second configuration file 125b may each include a programming code-based representation of the hardware resources 135a, the software resources 135b, and/or the network resources 135c in the information technology infrastructure 130. For example, the first configuration file 125a and/or the second configuration file 125b may be rendered in a configuration language (e.g., HashiCorp Configuration Language (HCL) provided by HashiCorp, San Francisco, Calif.) and/or a data interchange language (e.g., JavaScript Object Notation (JSON)) that is human readable and editable as well as machine readable. Moreover, the first configuration file 125a and/or the second configuration file 125b may specify one or more configurations to apply to the first information technology infrastructure 130a including, for example, the provisioning, modification, and/or de-provisioning of the hardware resources 135a, the software resources 135b, and/or the network resources 135c.

To further illustrate, Table 1 below depicts the syntax of a configuration language such as, for example, HashiCorp Configuration Language (HCL).

TABLE 1

```
# An AMI
variable "ami" {
  description = "the AMI to use"
}
/* A multi
line comment. */
resource "aws_instance" "web" {
  ami         = "${var.ami}"
  count       = 2
  source_dest_check = false
  connection {
    user = "root"
  }
}
```

Table 2 below depicts the syntax of a data interchange language such as, for example, JavaScript Object Notation (JSON).

TABLE 2

```
{
  "variable": {
    "ami": {
      "description": "the AMI to use"
    }
  },
  "resource": {
    "aws_instance": {
      "web": {
        "ami": "${var.ami}",
        "count": 2,
        "source_dest _check": false,
        "connection": {
          "user": "root"
        }
      }
    }
  }
}
```

In some example embodiments, the information technology infrastructure controller 110 may be configured to generate, based at least on the first configuration file 125a and/or the second configuration file 125b, an execution plan for applying, to the information technology infrastructure 130, the one or more configurations specified in the first configuration file 125a and/or the second configuration file 125b. For example, the first configuration file 125a and/or the second configuration file 125b may be sent to the version controller 140 before being transferred to the information technology infrastructure controller 110. The version controller 140 may be configured to manage and/or reconcile different versions of the first configuration file 125a and/or the second configuration file 125b. It should be appreciated that the version controller 140 may be any version control system, revision control system, and/or source control system capable of tracking and managing changes made to a configuration file by one or more users. For instance, the version controller 140 may be Github, Github Enterprise, GitLab, GitLab EE and CE, Bitbucket Cloud, Bitbucket Server, and/or the like. Alternatively and/or additionally, the version controller 140 may be the private and/or proprietary version control system implemented for exclusive use by an enterprise.

Figure 1B:
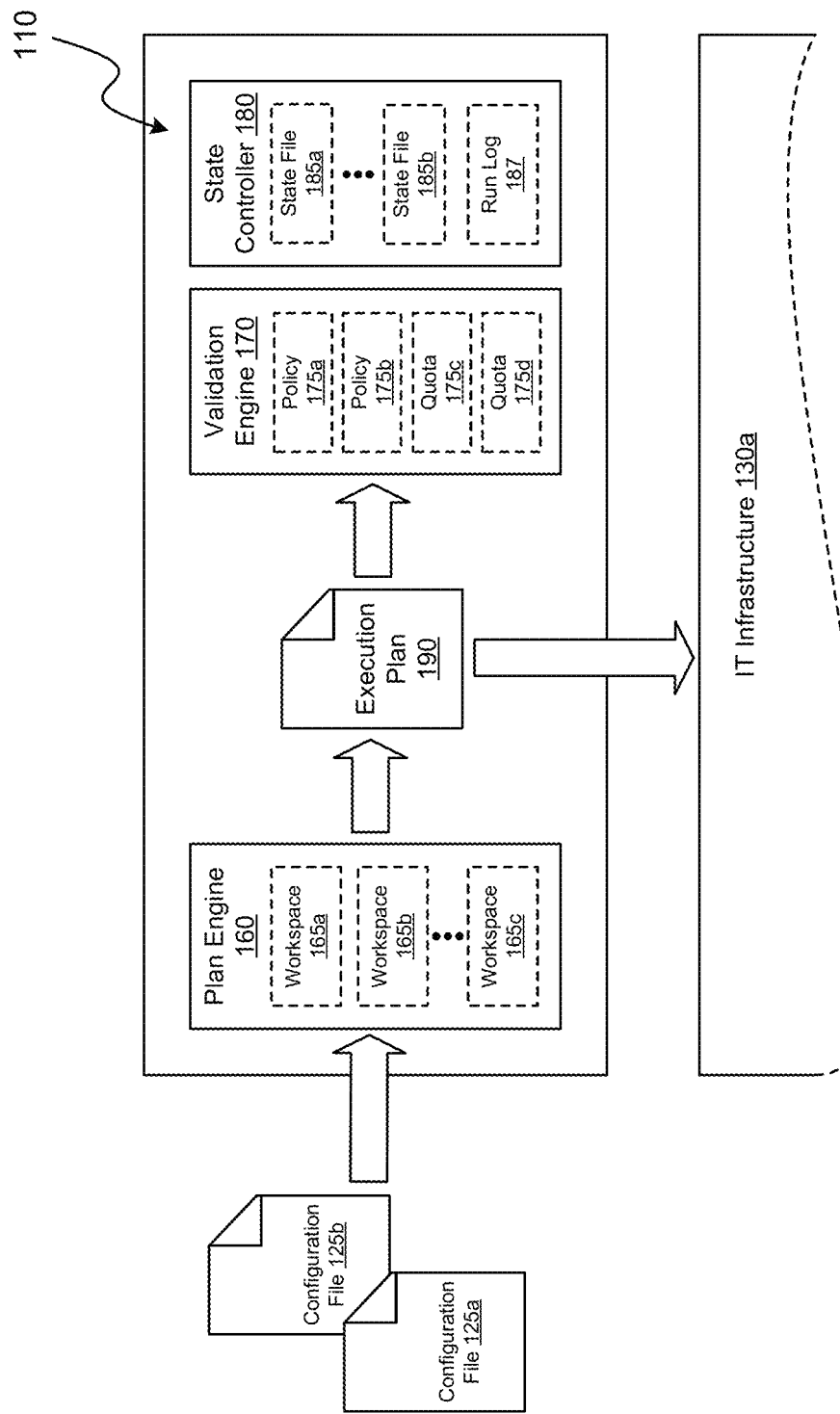
FIG. 1B depicts a block diagram illustrating an information technology infrastructure controller, in accordance with some example embodiments.

FIG. 1B depicts a block diagram illustrating the information technology infrastructure controller 110, in accordance with some example embodiments. Referring to FIGS. 1A-B, the information technology infrastructure controller 110 may include a plan engine 160, a validation engine 170, and a state controller 180. As shown in FIG. 1B, in some example embodiments, the information technology infrastructure controller 110 may be configured to generate an execution plan 190 for applying, to the first information technology infrastructure 130a, one or more configurations specified, for example, in the first configuration file 125a and/or the second configuration file 125b.

Referring again to FIG. 1B, the plan engine 160 may include one or more workspaces including, for example, a first workspace 165a, a second workspace 165b, and a third workspace 165c. Each of the first workspace 165a, the second workspace 165b, and the third workspace 165c may be configured to maintain the configurations for at least a portion of the first information technology infrastructure 130a. Alternatively, the first workspace 165a, the second workspace 165*b*, and/or the third workspace 165*c* may be configured to maintain configurations for different information technology infrastructures, each of which associated with a different organization. For instance, the first workspace 165*a* may maintain the configurations for at least a portion of the first information technology infrastructure 130*a* associated with one organization while the second workspace 165*b* may maintain the configurations for at least a portion of the second information technology infrastructure 130*b* associated with a different organization. When the first configuration file 125*a* and/or the second configuration filed 125*b* are pushed and/or pulled from the version controller 140, the plan engine 160 may merge the first configuration file 125*a* and/or the second configuration file 125*b* into the first workspace 165*a*, the second workspace 165*b*, and/or the third workspace 165*c*.

In some example embodiments, the first workspace 165*a*, the second workspace 165*b*, and the third workspace 165*c* may each maintain a different iteration of configurations for at least a portion of the first information technology infrastructure 130*a*. For example, the first workspace 165*a*, the second workspace 165*b*, and the third workspace 165*c* may each maintain the configurations that are applied to the first information technology infrastructure 130*a* in order to configure the first information technology infrastructure 130*a* to support a production environment, a staging environment, and a development environment for a software application. Accordingly, the first workspace 165*a* may maintain the configurations associated with a production environment, the second workspace 165*b* may maintain the configurations associated with a staging environment, and the third workspace 165*c* may maintain the configurations associated with a development environment.

Alternatively and/or additionally, each of the first workspace 165*a*, the second workspace 165*b*, and the third workspace 165*c* may be associated with the configurations for a specific portion the first information technology infrastructure 130*a*. For examples, the first workspace 165*a* may maintain the configurations for to the hardware resources 135*a* of the first information technology infrastructure 130*a*, the second workspace 165*b* may maintain the configurations for the software resources 135*b* of the first information technology infrastructure 130*a*, and the third workspace 165*c* may maintain the configurations for the network resources 135*c* of the first information technology infrastructure 130*a*.

In some example embodiments, the first workspace 165*a*, the second workspace 165*b*, and the third workspace 165*c* may each be associated with a different set of variables. Each set of variables may correspond to a different iteration of configurations for the first information technology infrastructure 130*a* (e.g., production environment, staging environment, development environment, and/or the like). Alternatively and/or additionally, each set of variables may correspond to the configurations for a different portion of the first information technology infrastructure 130*a* (e.g., the hardware resources 135*a*, the software resources 135*b*, the network resources 135*c*, and/or the like). At least some of these variables may be set and/or modified by the merging of the first configuration file 125*a* and/or the second configuration file 125*b* into the first workspace 165*a*, the second workspace 165*b*, and the third workspace 165*c*.

The first workspace 165*a*, the second workspace 165*b*, and the third workspace 165*c* may be associated with one or more organizations including, for example, the organization 155. However, as noted, the first workspace 165*a*, the second workspace 165*b*, and the third workspace 165*c* may be associated with multiple organizations, each of which having a distinct information technology infrastructure. Moreover, the first workspace 165*a*, the second workspace 165*b*, and the third workspace 165*c* may each be associated with a team of one or more users from the organization 155. For example, the first workspace 165*a* may be associated with a first team of users that includes the first user 145*a* at the first client 120*a* while the second workspace 165*b* may be associated with a second team of users that includes the second user 145*b* at the second client 120*b*. Each team of users may be accorded exclusive access to the corresponding workspace. Moreover, different users within a team of users may afforded different access privileges with respect to a corresponding workspace. For example, the first user 145*a* may be provided read access, write access, and/or administrative access to the first workspace 165*a* while the second user 145*b* may be provided read access, write access, and/or administrative access to the second workspace 165*b*. However, the first user 145*a* may be prevented from accessing the second workspace 165*b* if the first user 145 is not a member of the second team of user having exclusive access to the second workspace 165*b*. Likewise, the second user 145*b* may be prevented from accessing the first workspace 165*a* if the second user 145*b* is not a member of the first team of users having exclusive access to the first workspace 165*a*.

In some example embodiments, the first user 145*a* may access the first workspace 165*a* by at least merging the first configuration file 125*a* into the first workspace 165*a*. For example, the information technology infrastructure controller 110 may register, at the version controller 140, a webhook. The webhook may be a hypertext transfer protocol (HTTP) callback configured to post, to the information technology infrastructure controller 110, a notification when the first user 145*a* commits the first configuration file 125*a* at the version controller 140. Meanwhile, the information technology infrastructure controller 110 may respond to the notification by at least pulling the first configuration file 125*a* from the version controller 140 and merging of the first configuration file 125*a* into the first workspace 165*a*.

As noted, merging the first configuration file 125*a* into the first workspace 165*a* may set and/or modify at least some of the variables associated with the first workspace 165*a*. Moreover, by merging the first configuration file 125*a* into the first workspace 165*a*, the first user 145*a* may modify the configurations specified for at least a portion of the first information technology infrastructure 130*a*. For instance, merging the first configuration file 125*a* into the first workspace 165*a* may modify the configurations specified for the hardware resources 135*a* of the first information technology infrastructure 130*a* in order to provide a production environment for a software application. According to some example embodiments, two or more of the first workspace 165*a*, the second workspace 165*b*, and/or the third workspace 165*c* may be linked such that updating a variable in one workspace may trigger an update to the same variable at the linked workspaces.

Alternatively and/or additionally, the second user 145*b* may access the second workspace 165*b* by at least merging the second configuration file 125*b* into the second workspace 165*b*. The information technology infrastructure controller 110 may pull, from the version controller 140, the second configuration file 125*b* in response to a notification from the webhook at the version controller 140. Merging the second configuration file 125*b* into the second workspace 165*b* may modify the configurations specified for at least a portion of the first information technology infrastructure 130*a* by at least setting and/or modifying at least some of the variables associated with the second workspace 165*b*. For example, merging the second configuration file 125*b* into the second workspace 165*b* may modify the configurations specified for to the software resources 135*b* of the first information technology infrastructure 130*a* in order to provide a staging environment for a software application.

The information technology infrastructure controller 110 may generate, based at least on the configurations associated with the first workspace 165*a*, the second workspace 165*b*, and/or the third workspace 165*c*, the execution plan 190. The execution plan 190 may include one or more operations to provision, modify, and/or de-provision resources at the first information technology infrastructure 130*a* in order to apply, to the first information technology infrastructure 130*a*, the configurations associated with the first workspace 165*a*, the second workspace 165*b*, and/or the third workspace 165*c*.

In some example embodiments, the information technology infrastructure controller 110 may generate the execution plan 190 by at least consolidating the configurations associated with the first workspace 165*a*, the second workspace 165*b*, and the third workspace 165*c*. That is, the execution plan 190 may be generated to achieve a combination of the different iterations of the configurations for the first information technology infrastructure 130*a* and/or the configurations for different portions of the first information technology infrastructure 130*a*. Alternatively and/or additionally, the information technology infrastructure controller 110 may generate the execution plan 190 based on some but not all of the configurations associated with the first workspace 165*a*, the second workspace 165*b*, and/or the third workspace 165*c*. For example, the execution plan 190 may be generated to achieve only some iterations of the configurations for the first information technology infrastructure 130*a* and/or the configurations for only a portion of the first information technology infrastructure 130*a*.

In some example embodiments, the first workspace 165*a*, the second workspace 165*b*, and/or the third workspace 165*c* may be marked for automatic destruction. For example, the first workspace 165*a*, the second workspace 165*b*, and/or the third workspace 165*c* may persist for a period of time (e.g., 24 hours), after which the information technology infrastructure controller 110 may be configured to automatically destroy the first workspace 165*a*, the second workspace 165*b*, and/or the third workspace 165*c*. The first workspace 165*a*, the second workspace 165*b*, and/or the third workspace 165*c* may be persisted for a limited period of time in order to configure the first information technology infrastructure 130*a* to provide a temporary environment or disposable environment (e.g., a demo environment).

Figure 2:
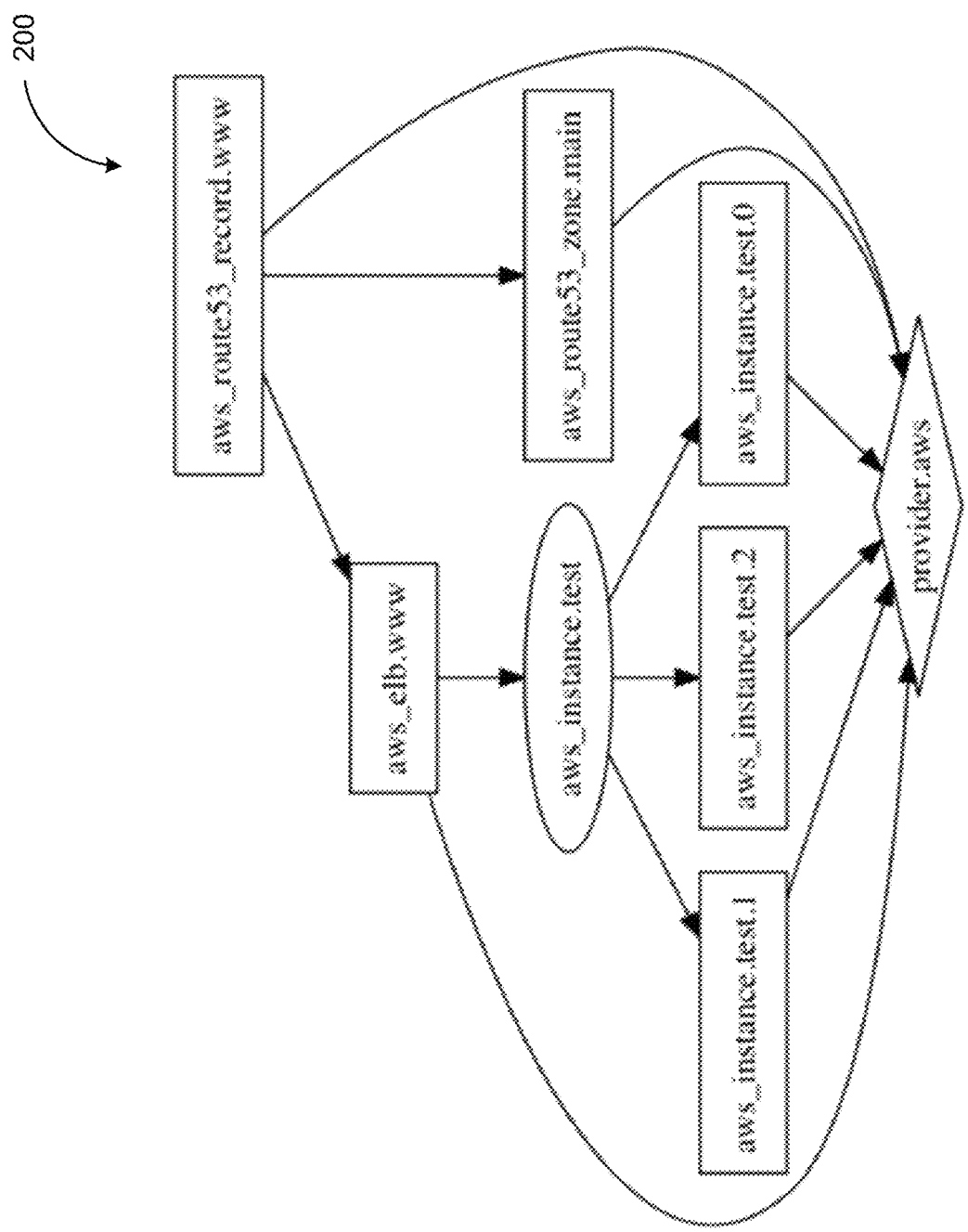
FIG. 2 depicts an example of a dependency graph, in accordance with some example embodiments.

The information technology infrastructure controller 110 may generate the execution plan 190 including by creating a corresponding dependency graph (e.g., a directed acyclic graph (DAG) and/or the like) having a plurality of nodes, at least some of which being interconnected by interconnected by one or more directed edges. FIG. 2 depicts an example of a dependency graph 200, in accordance with some example embodiments.

To apply the configurations associated with the execution plan 190 to the first information technology infrastructure 130*a*, the information technology infrastructure controller 110 may traverse the corresponding dependency graph. For instance, the information technology infrastructure controller 110 may perform a depth-first traversal of the dependency graph in order to determine the resources that the execution plan 190 indicates as requiring provisioning, modification, and/or de-provisioning. The information technology infrastructure controller 110 may further identify, based on the dependency graph, independent resources that may be provisioned, modified, and/or de-provisioned in parallel. It should be appreciated that the information technology infrastructure controller 110 may be configured to maximize parallelization when applying, to the first information technology infrastructure 130*a*, the configurations associated with the execution plan 190.

Table 3 below depicts examples of nodes that may be present in the dependency graph corresponding to the execution plan 190.

TABLE 3

| Type of Node | Description |
| --- | --- |
| Resource Node | Representative of a single resource such as, for example, a hardware resource, a software resource, a network resource, and/or the like. |
| Provider Node | Representative of a provider of one or more resources including, for example, hardware resources, software resources, network resources, and/or the like. Each provider node may include the time required to fully configure a corresponding provider to provide the corresponding resources. |
| Resource Meta Node | Representative of a group of resources including, for example, one or more hardware resources, software resources, network resources, and/or the like. |
| Data Node | Representative of data needing to be fetched, retrieved, and/or generated for purposes of configuring other resources and/or providers. |

The information technology infrastructure controller 110 may generate the dependency graph by at least adding, to the dependency graph, one or more resource nodes corresponding to individual resources including, for example, one or more hardware resources 135*a*, software resources 135*b*, network resources 135*c*, and/or the like. The one or more resource nodes may be mapped to the corresponding provider nodes, for example, to identify the first provider 150*a* and/or the second provider 150*b* as being the provider of the resources associated with each of the resource nodes. Moreover, the information technology infrastructure controller 110 may generate the dependency graph by at least inserting one or more edges to interconnect, for example, the resource nodes and the provider nodes. An edge interconnecting a resource node to a provider node may identify the provider associated with the provider node as being a provider of the resource associated with the resource node. Meanwhile, an edge interconnecting two resource nodes may indicate a dependency between the resources associated with the two resource nodes.

To represent resources that require de-provisioning, the dependency graph may include one or more "orphan" resource nodes, which may be disconnected from the provider nodes and other resource nodes in the dependency graph. Alternatively and/or additionally, in order to represent the modification of an existing resource within the first information technology infrastructure 130*a*, the information technology infrastructure controller 110 may generate the dependency graph by at least splitting the corresponding resource node into a first resource node and a second resource node. The first resource node may correspond to the existing resource, which may be de-provisioned when the configurations specified in the execution plan 190 are applied to the first information technology infrastructure 130*a*. Meanwhile, the second resource node may correspond to the modified resource, which may be provisioned when the configurations specified in the execution plan 190 are applied to the first information technology infrastructure 130a.

Referring again to FIG. 1B, the validation engine 170 may be configured to validate the execution plan 190 before the information technology infrastructure controller 110 applies the corresponding configurations to the information technology infrastructure 130. In some example embodiments, the validation engine 170 may be configured to perform a multitier validation of the execution plan 190 in order to determine whether the configurations associated with the execution plan 190 satisfy one or more requirements including, for example, valid configurations, proper permissions, cost compliance, and/or the like.

For instance, the validation engine 170 may perform a first tier of validation by at least determining the structural validity of the configurations associated with the execution plan 190 including, for example, the syntactic validity and/or semantic validity of the configurations associated with the execution plan 190. If the configurations associated with the execution plan 190 successfully passes the first tier of validation, the validation engine 170 may perform a second tier of validation by at least determining whether the configurations comply with one or more policies including, for example, a first policy 175a, a second policy 175b, and/or the like. The first policy 175a and/or the second policy 175b may impose limitations on the resources allocated by the configurations associated with the execution plan 190. Upon determining that the configurations associated with the execution plan 190 comply with the one or more policies, the validation engine 170 may perform a third tier of validation by at least determining whether the configurations associated with the execution plan 190 meet one or more cost quotas including, for example, a first quota 175c, a second quota 175d, and/or the like. The first quota 175c and/or the second quota 175d may impose target values and/or limits on the projected costs of the configurations associated with the execution plan 190.

In some example embodiments, a programming code based representation of the first policy 175a, the second policy 175b, the first quota 175c, and/or the second quota 175d may be used to provide the first policy 175a, the second policy 175b, the first quota 175c, and/or the second quota 175d to the validation engine 170. Furthermore, the first policy 175a, the second policy 175b, the first quota 175c, and/or the second quota 175d may be input by the first user 145a at the first client 120a and/or the second user 145b at the second client 120b. Alternatively and/or additionally, the first policy 175a, the second policy 175b, the first quota 175c, and/or the second quota 175d may be retrieved from a repository such as, for example, the version controller 140 and/or the like.

In some example embodiments, the first policy 175a, the second policy 175b, the first quota 175c, and/or the second quota 175d may be custom configured, for example, by the first user 145a and/or the second user 145b based at least on the first user 145a and/or the second user 145b having the necessary access privileges (e.g., administrative access and/or the like) for setting and/or modifying a policy at the validation engine 170. Moreover, the first policy 175a, the second policy 175b, the first quota 175c, and/or the second quota 175d may be custom configured to have limited applicability. For example, each of the first workspace 165a, the second workspace 165b, and the third workspace 165c may be associated with attributes including, for example, environment, application type, region, cloud, and/or the like. Whether a policy or a cost quota is applicable to each of the first workspace 165a, the second workspace 165b, and/or the third workspace 165c may be determined based on the corresponding attributes. That is, the validation engine 170 may identify the policies and/or cost quotas that are applicable to a workspace by at least filtering a broader set of policies and/or cost quotas based on the attributes of the workspace.

Accordingly, the first policy 175a and/or the first quota 175c may be configured to apply only to configurations associated with a staging environment while the second policy 175b and/or the second quota 175d may be configured to apply only to configurations associated with a production environment. Alternatively and/or additionally, the first policy 175a and/or the first quota 175c may be configured to apply only to configurations associated with one portion of the first information technology infrastructure 130a (e.g., the hardware resources 135a) while the second policy 175b and/or the second quota 175d may be configured to apply only to configurations associated with a different portion of the first information technology infrastructure 130a (e.g., the network resources 135c). In some example embodiments, the execution plan 190 may be validated against requirements that are classified as advisory, mandatory, and/or semi-mandatory. For example, the first policy 175a, the second policy 175b, the first quota 175c, and/or the second quota 175d may be classified as advisory, mandatory, and/or semi-mandatory. Applying a requirement that is classified as advisory may merely trigger a notification (e.g., an informative output displayed at the first client 120a and/or the second client 120b) indicative, for example, of the configurations associated with the execution plan 190 as failing to comply with the requirement. By contrast, applying a requirement that is classified as mandatory and/or semi-mandatory may prevent the configurations associated with the execution plan 190 from being applied at the first information technology infrastructure 130a in the event the configurations fail to satisfy the requirement. Moreover, while advisory requirements and semi-mandatory requirements may be overridden, a mandatory requirement must be satisfied before the configurations associated with the execution plan 190 may be applied at the first information technology infrastructure 130a.

In some example embodiments, the first policy 175a, the validation engine 170 may invoke an externally configured service in order to verify whether the execution plan 190 satisfies one or more externally configured policies and/or quotas. For example, the first policy 175a, the second policy 175b, the first quota 175c, and/or the second quota 175d may be configured externally by a web hook mechanism. The result of the external validation (e.g., a pass and/or fail status) may be returned to the validation engine 170 via an application programming interface (API). The one or more externally configured policies and/or quotas may also be classified as advisory, mandatory, and/or semi-mandatory. Accordingly, failure of an external policy and/or quota classified as mandatory and/or semi-mandatory may prevent the execution plan 190 from being applied at the first information technology infrastructure 130a. Contrastingly, failure of an external policy and/or quota classified as advisory may trigger instead a notification (e.g., an informative output displayed at the first client 120a and/or the second client 120b) indicative, for example, of the configurations associated with the execution plan 190 as being non-compliant.

The information technology infrastructure controller 110 may apply, to the information technology infrastructure 130, the configurations associated with the first workspace 165a, the second workspace 165b, and/or the third workspace 165c by at least performing the operations included in the execution plan 190, for example, to provision, modify, and/or de-provision one or more resources at the first information technology infrastructure 130a. According to some example embodiments, the information technology infrastructure controller 110 may be configured to implement the execution plan 190 based at least on the execution plan 190 having been successfully validated by the validation engine 170. The validation engine 170 may be configured to provide an indication of the execution plan 190 as having been successfully or unsuccessfully validated by the validation engine 170. Alternatively and/or additionally, the validation engine 170 may provide an indication of the execution plan 190 as having passed or failed each of the first policy 175a, the second policy 175b, the first quota 175c, the second quota 175d, and/or the like. As noted, one or more of the first policy 175a, the second policy 175b, the first quota 175c, and/or the second quota 175d may be classified as advisory and/or semi-mandatory. These policies and/or quotas may be overridden and/or excluded from the validation of the execution plan 190. Alternatively, one or more of the first policy 175a, the second policy 175b, the first quota 175c, and/or the second quota 175d may be classified as mandatory. Mandatory policies and/or quotas may not be overridden and/or excluded from the validation of the execution plan 190. Instead, the configurations associated with the execution plan 190 may be required to satisfy all mandatory policies and/or quotas before the configurations may be applied at the first information technology infrastructure 130a.

In some example embodiments, instead of and/or in addition to the information technology infrastructure controller 110 ingesting, from the version controller 140, the first configuration file 125a and/or the second configuration file 125b before merging the first configuration file 125a and/or the second configuration file 125b into the first workspace 165a, the second workspace 165b, and/or the third workspace 165c to generate the execution plan 190, the first user 145a at the first client 120a and/or the second user 145b at the second client 120b may upload the execution plan 190 directly to the information technology infrastructure controller 110, for example, via an application programming interface (API). Furthermore, the first user 145a at the first client 120a and/or the second user 145b at the second client 120b may remotely execute the execution plan 190, for example, to provision, modify, and/or de-provision resources in the first information technology infrastructure 130a.

In some example embodiments, the state controller 180 may be configured to track the changes that are applied to the configurations of the first information technology infrastructure 130a. For example, the state controller 180 may generate and store a state file prior to implementing an execution plan such as, for example, the execution plan 190. The state file may capture a current state at the first information technology infrastructure 130a, including one or more existing configurations at the first information technology infrastructure 130a, prior to the application of the configurations associated with the execution plan 190. The information technology infrastructure controller 110 may determine, based on one or more state files generated and stored by the state controller 180, a previous state of the first information technology infrastructure 130a including, for example, one or more previous configurations at the first information technology infrastructure 130a. Alternatively and/or additionally, the information technology infrastructure controller 110 may restore, based at on the one or more state files generated and stored by the state controller 180, the first information technology infrastructure 130a to a previous state.

For instance, as FIG. 1B shows, the state controller 180 may generate and store a plurality of state files including, for example, a first state file 185a, a second state file 185b, and/or the like. The first state file 185a and the second state file 185b may capture successive states of the first information technology infrastructure 130a. For example, the first state file 185a may capture the configurations at the first information technology infrastructure 130a at a first time $t_1$ prior to the implementation of a first execution plan while the second state file 185b may capture the configurations at the first information technology infrastructure 130a at a second time $t_2$ prior to the implementation of a second execution plan. The information technology infrastructure controller 110 may generate, based at least on the first state file 185a and the second state file 185b, a delta file or a difference file showing the difference between the configurations at the first information technology infrastructure 130a at the first time $t_1$ and the configurations at the first information technology infrastructure 130a at the second time $t_2$.

Moreover, the information technology infrastructure controller 110 may restore, based at least on the first state file 185a, the first information technology infrastructure 130a to a state at the first time $t_1$. Alternatively and/or additionally, the information technology infrastructure controller 110 may restore, based at least on the second state file 185b, the first information technology infrastructure 130a to a state at the second time $t_2$. It should be appreciated that by restoring the first information technology infrastructure 130a to an earlier state, the information technology infrastructure controller 110 may reverse subsequent changes to the configurations of the first information technology infrastructure 130a.

Table 4 below depicts an example of a state file. As Table 4 shows, the state controller 180 may generate, prior to implementing an execution plan, a state file to capture a current state of the first information technology infrastructure 130a, including one or more existing configurations at the first information technology infrastructure 130a.

TABLE 4

```
aws_instance.example:
    id = i-32cf65a8
    ami = ami-2757f631
    availability_zone = us-east-1a
    instance_state = running
    instance_type = t2.micro
    private_ip = 172.31.30.244
    public_dns = ec2-52-90-212-55.compute-1.amazonaws.com
    public_ip = 52.90.212.55
    subnet_id = subnet-1497024d
    vpc_security_group_ids.# = 1
    vpc_security_group_ids.3348721628 = sg-67672003
```

Referring again to FIG. 1B, the state controller 180 may also maintain a run log 187 tracking, for example, various runs of one or more execution plans including, for example, the execution plan 190. As used herein, "running" the execution plan 190 may include generating the execution plan 190, validating the execution plan 190, applying the configurations associated with the execution plan 190, canceling the execution plan 190, discarding the execution plan 190, and/or the like. Accordingly, each run of an execution plan may be associated with a run status including, for example, planning, planned, error, confirmed, applying, applied, canceled, discarded, pending, policy checking, policy checked, policy override, and/or the like. The run log 187 may be configured to track the runs of one or more execution plan including, for example, by storing a corresponding run status for each of the runs.

In some example embodiments, the state controller 180 may maintain state files and run logs for each individual workspace. For example, the first state file 185a, the second state file 185b, and the run log 187 may be associated with the first workspace 165a while the state controller 180 may maintain additional state files and run logs for the other workspaces including, for example, the second workspace 165b, the third workspace 165c, and/or the like. However, it should be appreciated that the first state file 185a, the second state file 185b, and the run log 187 may be associated with the first information technology infrastructure 130a as a whole instead of any individual workspace associated with the first information technology infrastructure 130a.

Figure 1C:
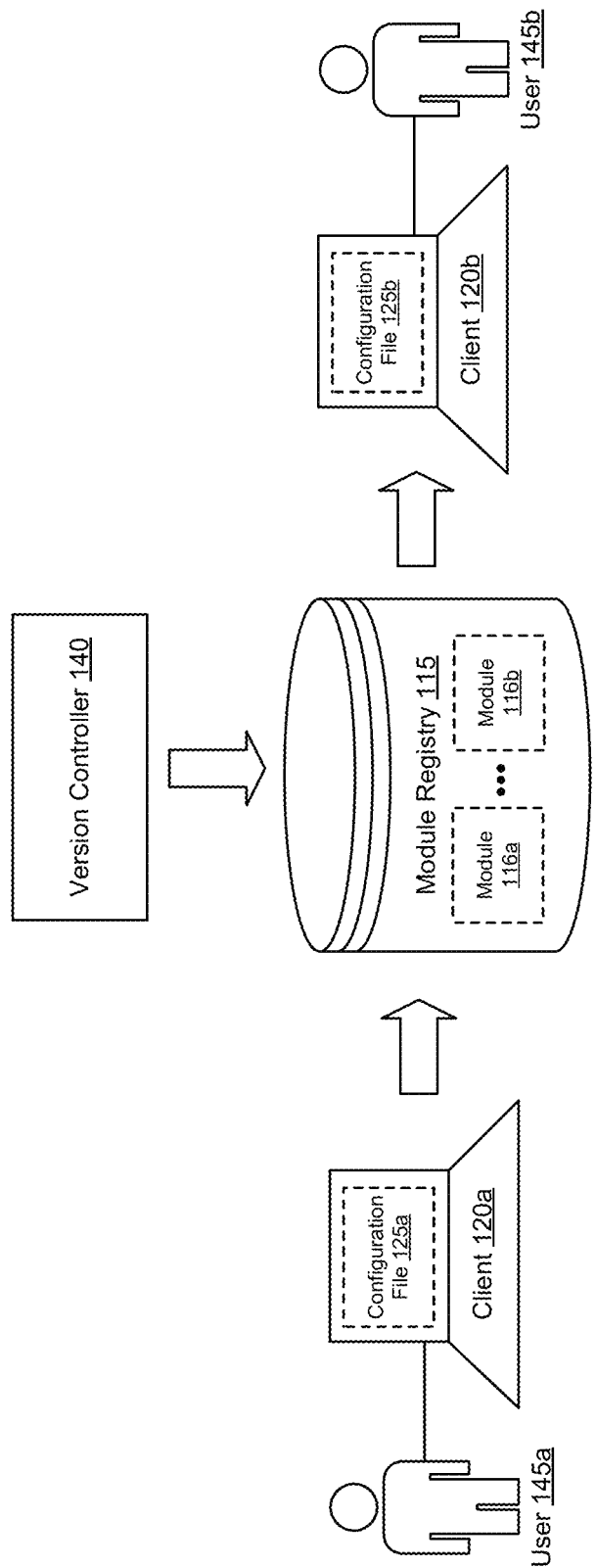
FIG. 1C depicts a block diagram illustrating a module registry, in accordance with some example embodiments.

FIG. 1C depicts a block diagram illustrating a module registry 115, in accordance with some example embodiments. Referring to FIGS. 1A-C, the module registry 115 may include a plurality of infrastructure modules including, for example, a first module 116a, a second module 116b, and/or the like. The first module 116a and the second module 116b may each include the configurations that may be applied to an information technology infrastructure (e.g., the first information technology infrastructure 130a, the second information technology infrastructure 130b, and/or the like) to achieve, at least partially, an information technology objective such as, for example, support for a software application, a multi-tier software application, self-service clusters, software demonstrations, disposable environments (e.g., production environments, staging environments, and/or the like), software defined networking, resource schedulers, multi-cloud deployment, and/or the like.

Referring again to FIG. 1C, the first user 145a may create the first module 116a and/or the second module 116b while creating the first configuration file 125a at the first client 120a. The first user 145a may publish the first module 116a and/or the second module 116b such that the second user 145b may add, to the second configuration file 125b, the first module 116a and/or the second module 116b while the second user 145b is creating the second configuration file 125b at the second client 120b. Adding the first module 116a and/or the second module 116b to the second configuration file 125b may incorporate, into the second configuration file 125b, the configurations included in first module 116a and/or the second module 116b. For example, the first module 116a and/or the second module 116b may include the provisioning, modification, and/or de-provisioning of one or more of the hardware resources 135a, the software resources 135b, and/or the network resources 135c at the first information technology infrastructure 130a to support the deployment, testing, and/or maintenance of a software application. Accordingly, adding to the first module 116a and/or the second module 116b to the second configuration file 125b may incorporate, into the second configuration file 125b, the provisioning, modification, and/or de-provisioning of the same resources, for example, at a different information technology infrastructure such as the second information technology infrastructure 130b.

In some example embodiments, the first module 116a and/or the second module 116b may be published directly to the module registry 115 by adding, to the module registry 115, a version of the first module 116a and/or the second module 116b. Alternatively and/or additionally, the first module 116a and/or the second module 116b may be published via the version controller 140. Publishing the first module 116a and/or the second module 116b via the version controller 140 may include registering, at the version controller 140, a webhook (e.g., a hypertext transfer protocol (HTTP) callback) configured to post, to the information technology infrastructure controller 110, a notification whenever a different version of the first module 116a and/or the second module 116b is committed to the version controller 140. Accordingly, instead of storing static versions of the first module 116a and/or the second module 116b, the information technology infrastructure controller 110 may update the module registry 115 whenever, for example, the first user 145a creates another version of the first module 116a and/or the second module 116b. In doing so, the second user 145b may have access to multiple versions of the first module 116a and/or the second module 116b including, for example, the most recent versions of the first module 116a and/or the second module 116b, when creating the second configuration file 125b.

In some example embodiments, the module registry 115 may be associated with the organization 155 such that only users from the organization 155 (e.g., the first user 145a at the first client 120a and/or the second user 145b at the second client 120b) may have access to the module registry 115, for example, to publish modules, consume modules, and/or the like. For example, the first user 145a may publish the first module 116a and/or the second module 116b to the module registry 115 and the second user 145b may consume the first module 116a and/or the second module 116b from the module registry 115 based at least on the first user 145a and the second user 145b being associated with the organization 155. A user who is not associated with the organization 155 may be prevented from accessing the module registry 115. That is, a user who is not associated with the organization 155 may neither publish nor consume an infrastructure module from the module registry 115.

Table 5 below depicts programming code for an example of a module named "consul." This module may be sourced from a public registry, a private registry, and/or version control system. In some example embodiments, the module may be associated with a version constraint to ensure that a specific version of the module is fetched from the public registry, private registry, and/or version control system. The module may require additional configuration such as, for example, the quantity of servers. These additional configurations may be optional in some instances and mandatory in others.

TABLE 5

```
module "consul" {
source = "hashicorp/consul/aws"
version = "~> 0.0.5"
servers = 3
}
resource "aws_instance" "client" {
ami              = "ami-408c7f28"
instance_type    = "t1.micro"
availability_zone = "${module.consul.server_availability_zone}"
}
```

Figure 3A:
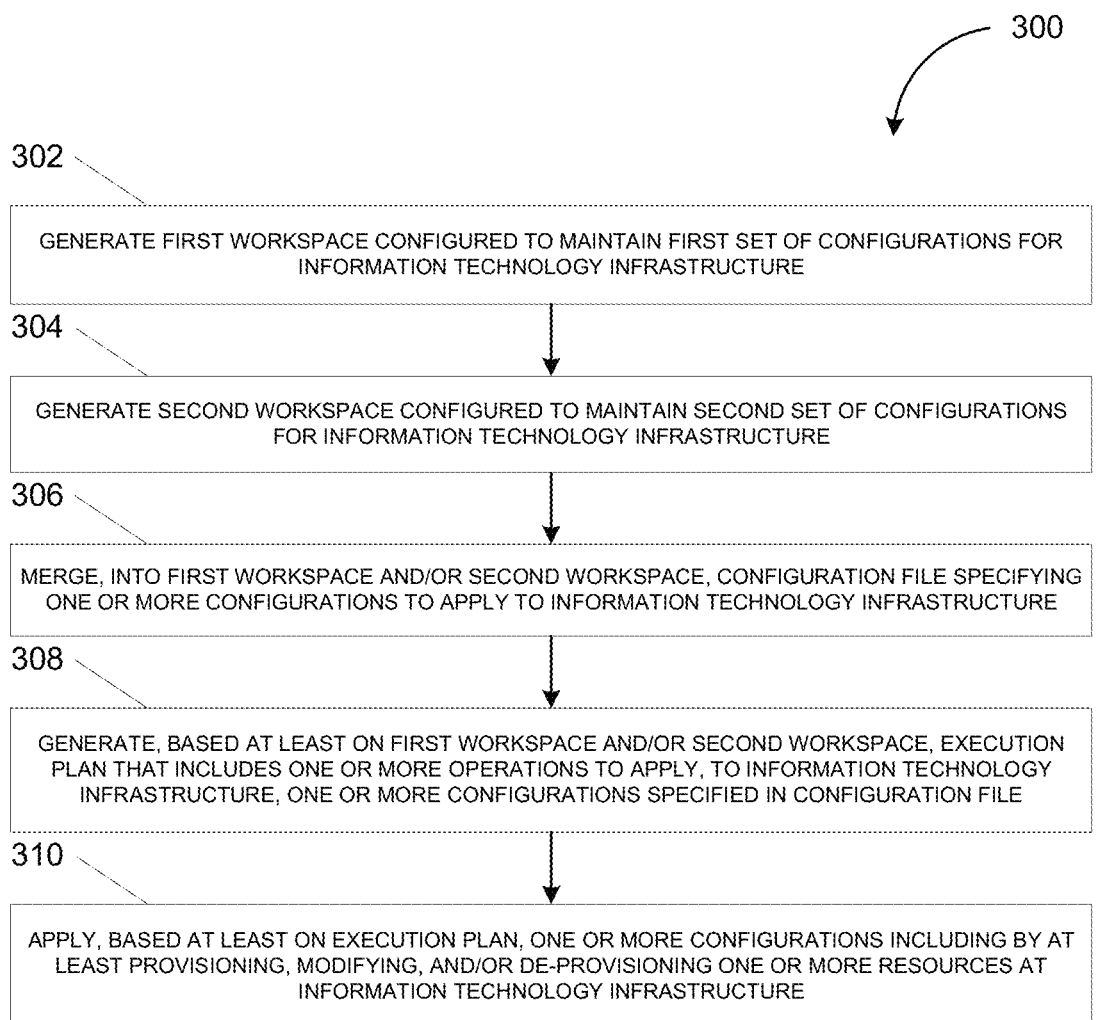
FIG. 3A depicts a flowchart illustrating a process for managing an information technology infrastructure, in accordance with some example embodiments.

FIG. 3A depicts a flowchart illustrating a process 300 for managing the information technology infrastructure 130, in accordance with some example embodiments. Referring to FIGS. 1A-C, 2, and 3A, the process 300 may be performed by the information technology infrastructure controller 110 to manage an information technology infrastructure such as, for example, the first information technology infrastructure 130a. For example, the management of the first information technology infrastructure 130a may include the provisioning, modification, and/or de-provisioning of one or more of the hardware resources 135a, the software resources 135b, and/or the network resources 135c to achieve an information technology objective such as, for example, support for a software application, a multi-tier software application, self-service clusters, software demonstrations, disposable environments (e.g., production environments, staging environments, and/or the like), software defined networking, resource schedulers, multi-cloud deployment, and/or the like. Nevertheless, it should be appreciated that the information technology infrastructure controller 110 may also perform the process 300 to manage other information technology infrastructures including, for example, the second information technology infrastructure 130b and/or the like.

The information technology infrastructure controller 110 may generate a first workspace configured to maintain a first set of configurations for the first information technology infrastructure 130a (302). Furthermore, the information technology infrastructure controller 110 may generate a second workspace configured to maintain a second set of configurations for the first information technology infrastructure 130a (304). In some example embodiments, the information technology infrastructure controller 110, for example, the plan engine 160, may generate the first workspace 165a, the second workspace 165b, and/or the third workspace 165c. The first workspace 165a, the second workspace 165b, and the third workspace 165c may each maintain a different iteration of configurations for at least a portion of the first information technology infrastructure 130a. For example, the first workspace 165a, the second workspace 165b, and the third workspace 165c may each maintain the configurations that are applied to the first information technology infrastructure 130a in order to configure the first information technology infrastructure 130a to support a production environment, a staging environment, and a development environment for a software application.

Alternatively and/or additionally, each of the first workspace 165a, the second workspace 165b, and the third workspace 165c may be associated with the configurations for a specific portion the first information technology infrastructure 130a. For instance, the first workspace 165a may maintain the configurations for to the hardware resources 135a of the first information technology infrastructure 130a, the second workspace 165b may maintain the configurations for the software resources 135b of the first information technology infrastructure 130a, and the third workspace 165c may maintain the configurations for the network resources 135c of the first information technology infrastructure 130a. As noted, different workspaces may also be generated to maintain configurations for different information technology infrastructures. For example, the first workspace 165a may be associated with configurations for at least a portion of the first information technology infrastructure 130a while the second workspace 165b may be associated with configurations for at least a portion of the second information technology infrastructure 130b.

The information technology infrastructure controller 110 may merge, into the first workspace and/or the second workspace, a configuration file specifying one or more configurations to apply to the first information technology infrastructure 130a (306). In some example embodiments, the information technology infrastructure controller 110 may register, at the version controller 140, a webhook (e.g., a hypertext transfer protocol (HTTP) callback) configured to post, to the information technology infrastructure controller 110, a notification the first configuration file 125a and/or the second configuration file 125b are committed at the version controller 140. The information technology infrastructure controller 110 may respond to the notification from the webhook at the version controller 140 by at least pulling the first configuration file 125a and/or the second configuration file 125b from the version controller 140. Furthermore, the information technology infrastructure controller 110 may merge the first configuration file 125a into the first workspace 165a and the second configuration file 125b into the second workspace 165b. As noted, merging the first configuration file 125a into the first workspace 165a may set and/or modify at least some of the variables associated with the first workspace 165a, for example, to modify the configurations specified for the hardware resources 135a of the first information technology infrastructure 130a. Meanwhile, merging the second configuration file 125b into the second workspace 165b may set and/or modify at least some of the variables associated with the second workspace 165b, for example, to modify the configurations specified for the software resources 135b of the first information technology infrastructure 130a.

The information technology infrastructure controller 110 may generate, based at least on the first workspace and/or the second workspace, an execution plan that includes one or more operations to apply, to the first information technology infrastructure 130a, the one or more configurations specified in the configuration file (308). In some example embodiments, the information technology infrastructure controller 110 may generate the execution plan 190 by at least consolidating the configurations associated with the first workspace 165a, the second workspace 165b, and the third workspace 165c. Alternatively and/or additionally, the information technology infrastructure controller 110 may generate the execution plan 190 based on some but not all of the configurations associated with the first workspace 165a, the second workspace 165b, and/or the third workspace 165c.

The information technology infrastructure controller 110 may apply, based at least on the execution plan, the one or more configurations including by at least provisioning, modifying, and/or de-provisioning one or more resources at the first information technology infrastructure 130a (310). In some example embodiments, to apply the configurations associated with the execution plan 190 to the first information technology infrastructure 130a, the information technology infrastructure controller 110 may generate and traverse a corresponding dependency graph. For example, the information technology infrastructure controller 110 may generate the dependency graph 200, which may include a plurality of resource nodes and provider nodes, at least some of which being interconnected by one or more directed edges. The information technology infrastructure controller 110 may traverse the dependency graph 200 to at least identify independent resources that may be provisioned, modified, and/or de-provisioned in parallel. As noted, the information technology infrastructure controller 110 may be configured to maximize parallelization when applying, to the first information technology infrastructure 130a, the configurations associated with the execution plan 190.

Figure 3B:
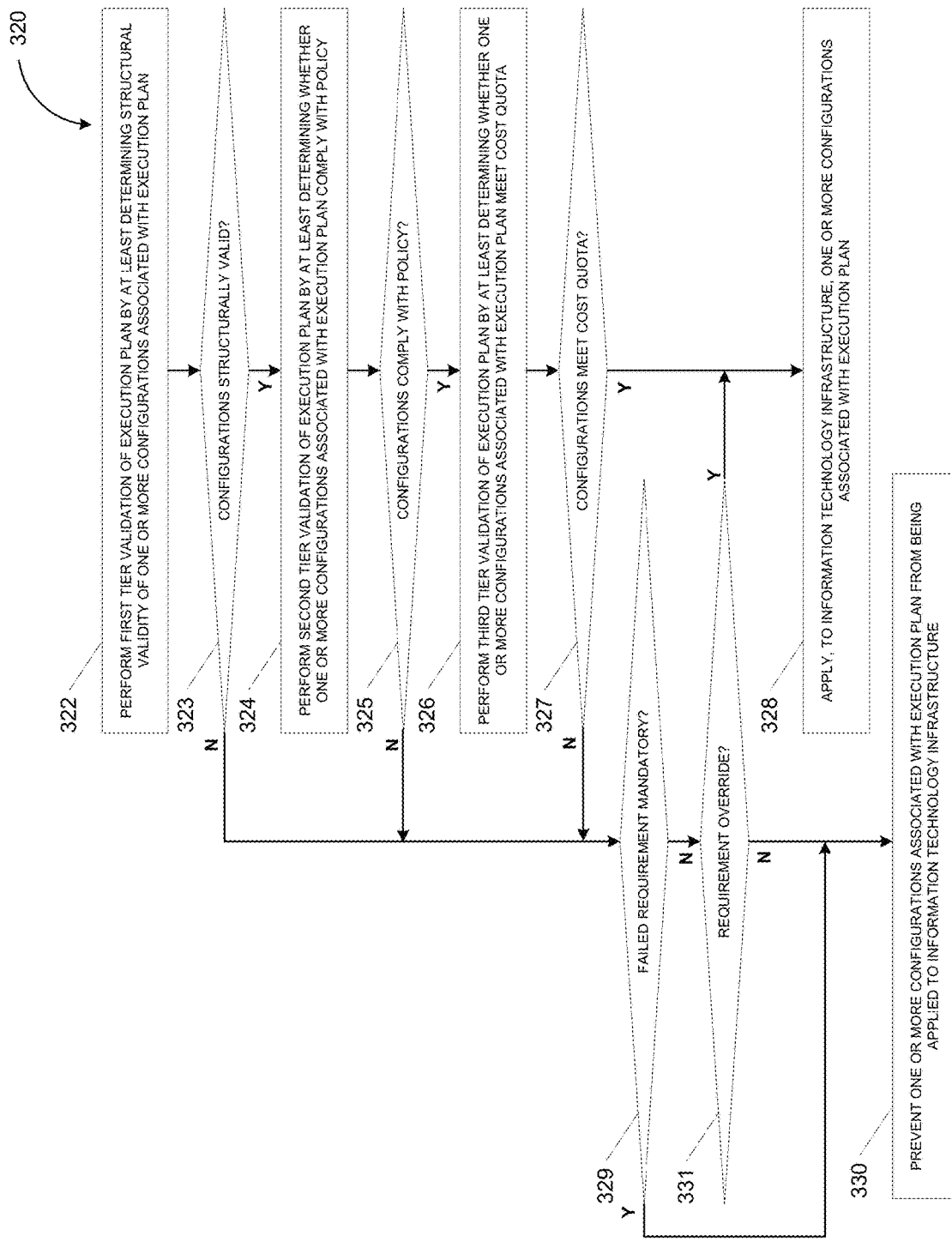
FIG. 3B depicts a flowchart illustrating a process for running an execution plan to an information technology infrastructure, in accordance with some example embodiments.

FIG. 3B depicts a flowchart illustrating a process 320 for running an execution plan, in accordance with some example embodiments. Referring to FIGS. 1A-C, 2, and 3B, the process 320 may be performed by the information technology infrastructure controller 110, for example, to perform a multitier validation of the execution plan 190 before the configurations associated with the execution plan 190 are applied to the first information technology infrastructure 130*a*. As noted, the execution plan 190 may include one or more operations, which may be applied to the first information technology infrastructure 130*a* in order to realize one or more configurations for achieving an information technology objective such as, for example, support for a software application, a multi-tier software application, self-service clusters, software demonstrations, disposable environments (e.g., production environments, staging environments, and/or the like), software defined networking, resource schedulers, multi-cloud deployment, and/or the like. The multitier validation of the execution plan 190 may include determining whether the configurations associated with the execution plan 190 satisfy one or more requirements including, for example, advisory, mandatory, and/or semi-mandatory requirements.

The information technology infrastructure controller 110 may perform a first tier validation of the execution plan 190 by at least determining a structural validity of one or more configurations associated with the execution plan 190 (322). In some example embodiments, the information technology infrastructure controller 110, for example, the validation engine 170, may determine whether the configurations associated with the execution plan 190 are free from syntactic errors (e.g., typographical errors, syntax errors, formatting errors, and/or the like) and/or semantic errors that would prevent the configurations from being processed. For example, the information technology infrastructure controller 110 may detect a syntactic error if the configurations associated with the execution plan 190 requests a negative quantity of resources and/or if the quantity of resources are defined using a string value instead of a numeric value. Alternatively and/or additionally, the information technology infrastructure controller 110 may detect a semantic error if a mismatch in dependent resources is present in the configurations associated with the execution plan 190.

The information technology infrastructure controller 110 may determine that the configurations associated with the execution plan 190 are structurally valid (323-Y). Accordingly, the information technology infrastructure controller 110 may perform a second tier validation of the execution plan 190 by at least determining whether the one or more configurations associated with the execution plan 190 comply with at least one policy (424). For example, in some example embodiments, the information technology infrastructure controller 110, for example, the validation engine 170, may further validate the execution plan 190 by at least determining whether the first information technology infrastructure 130*a* would satisfy the requirements imposed by the first policy 175*a* and/or the second policy 175*b* if the configurations associated with the execution plan 190 are applied to the first information technology infrastructure 130*a*. The first policy 175*a* and/or the second policy 175*b* may each impose one or more limitations on the resources allocated for the first information technology infrastructure 130*a*. For instance, the first policy 175*a* may impose a maximum and/or a minimum on a quantity of a resource allocated for the first information technology infrastructure 130*a*. Meanwhile, the second policy 175*b* may specify that an X instance type may only be built during a Y period in a Z region of the first information technology infrastructure 130*a*.

The information technology infrastructure controller 110 may determine that the configurations associated with the execution plan 190 comply with the at least one policy (325-Y). As such, the information technology infrastructure controller 110 may perform a third tier validation of the execution plan 190 by at least determining whether the one or more configurations of the execution plan 190 meet at least one cost quota (326). In some example embodiments, the information technology infrastructure controller 110, for example, the validation engine 170, may further validate the execution plan 190 by at least determining whether the first information technology infrastructure 130*a* would satisfy the requirements imposed by the first quota 175*c* and/or the second quota 175*d* if the configurations associated with the execution plan 190 are applied to the first information technology infrastructure 130*a*. The first quota 175*c* and/or the second quota 175*d* may impose limitations of the projected costs of the configurations associated with the execution plan 190. Accordingly, the information technology infrastructure controller 110 may determine whether the first information technology infrastructure 130*a* would exceed these limitations on projected costs if the configurations associated with the execution plan 190 are applied to the first information technology infrastructure 130*a*.

The information technology infrastructure controller 110 may determine that the configurations associated with the execution plan 190 meet the at least one cost quota (327-Y). As such, the information technology infrastructure controller 110 may apply, to the first information technology infrastructure 130*a*, the one or more configurations associated with the execution plan 190 (328). For example, the information technology infrastructure controller 110 may implement the execution plan 190 based at least on the configurations associated with the execution plan 190 having successfully passed the multitier validation. Implementing the execution plan 190 may include applying, to the first information technology infrastructure 130*a*, the configurations associated with the execution plan 190. For example, applying, to the first information technology infrastructure 130*a*, the configurations associated with the execution plan 190 may include provisioning, modifying, and/or de-provisioning one or more of the hardware resources 135*a*, software resources 135*b*, and/or network resources 135*c* associated with the information technology infrastructure 130.

As noted, the information technology infrastructure controller 110 may perform a multitier validation of the execution plan 190. The configurations associated with the execution plan 190 may be applied at the first information technology infrastructure 130*a* if the configurations associated with the execution plan 190 successfully passes the multitier validation including, for example, by being structurally valid, complying with at least one policy, and meeting at least one cost quota. By contrast, the information technology infrastructure controller 110 may also determine that the execution plan 190 fails to pass at least a portion of the multitier validation. For example, the information technology infrastructure controller 110 may determine that the configurations associated with the execution plan 190 are not structurally valid (323-N). Alternatively, the information technology infrastructure controller 110 may determine that the configurations associated with the execution plan 190 do not comply with at least one policy (325-N). The information technology infrastructure controller 110 may also determine that the configurations associated with the execution plan 190 do not meet at least one cost quota (327-N).

In the event the information technology infrastructure controller 110 determines that the execution plan 190 fails to pass any portion of the multitier validation, the information technology infrastructure controller 110 may determine if the failed requirement is mandatory (329). In some example embodiments, as part of the multitier validation, the execution plan 190 may be validated against requirements classified as advisory, mandatory, and/or semi-mandatory. For example, the structural validity of the execution plan 190 may be classified as a mandatory requirement. By contrast, the policy compliance of the execution plan 190 may be classified as a semi-mandatory requirement whereas the cost quota compliance of the execution plan 190 may be classified as an advisory requirement. As noted, while advisory requirements and semi-mandatory requirements may be overridden, a mandatory requirement must be satisfied before the configurations associated with the execution plan 190 may be applied at the first information technology infrastructure 130a.

Accordingly, if the information technology infrastructure controller 110 determines that the execution plan 190 failed a mandatory requirement (329-Y), the information technology infrastructure controller 110 may prevent the one or more configurations associated with the execution plan 190 from being applied to the first information technology infrastructure 130a (330). In some example embodiments, the information technology infrastructure controller 110 may provide an indication of the execution plan 190 as having been successfully or unsuccessfully validated by the validation engine 170. Alternatively and/or additionally, the information technology infrastructure controller 110 may provide an indication of the execution plan 190 as being structurally invalid and/or having passed or failed each of the first policy 175a, the second policy 175b, the first quota 175c, and/or the second quota 175d. These indications may include any form of notification including, for example, an email, a slack message, a webhook, and/or the like.

Alternatively, if the information technology infrastructure controller 110 determines that the execution plan 190 failed a non-mandatory requirement (329-N), the information technology infrastructure controller 110 may determine whether the requirement is overridden (331). If the information technology infrastructure controller 110 determines that the execution plan 190 failed a non-mandatory requirement that is overridden (331-Y), the information technology infrastructure controller 110 may apply, to the first information technology infrastructure 130a, the one or more configurations associated with the execution plan 190. By contrast, if the information technology infrastructure controller 110 determines that the execution plan 190 failed a non-mandatory requirement that is not overridden (331-N), the information technology infrastructure controller 110 may prevent the one or more configurations associated with the execution plan 190 from being applied at the first information technology infrastructure 130a (330).

Figure 3C:
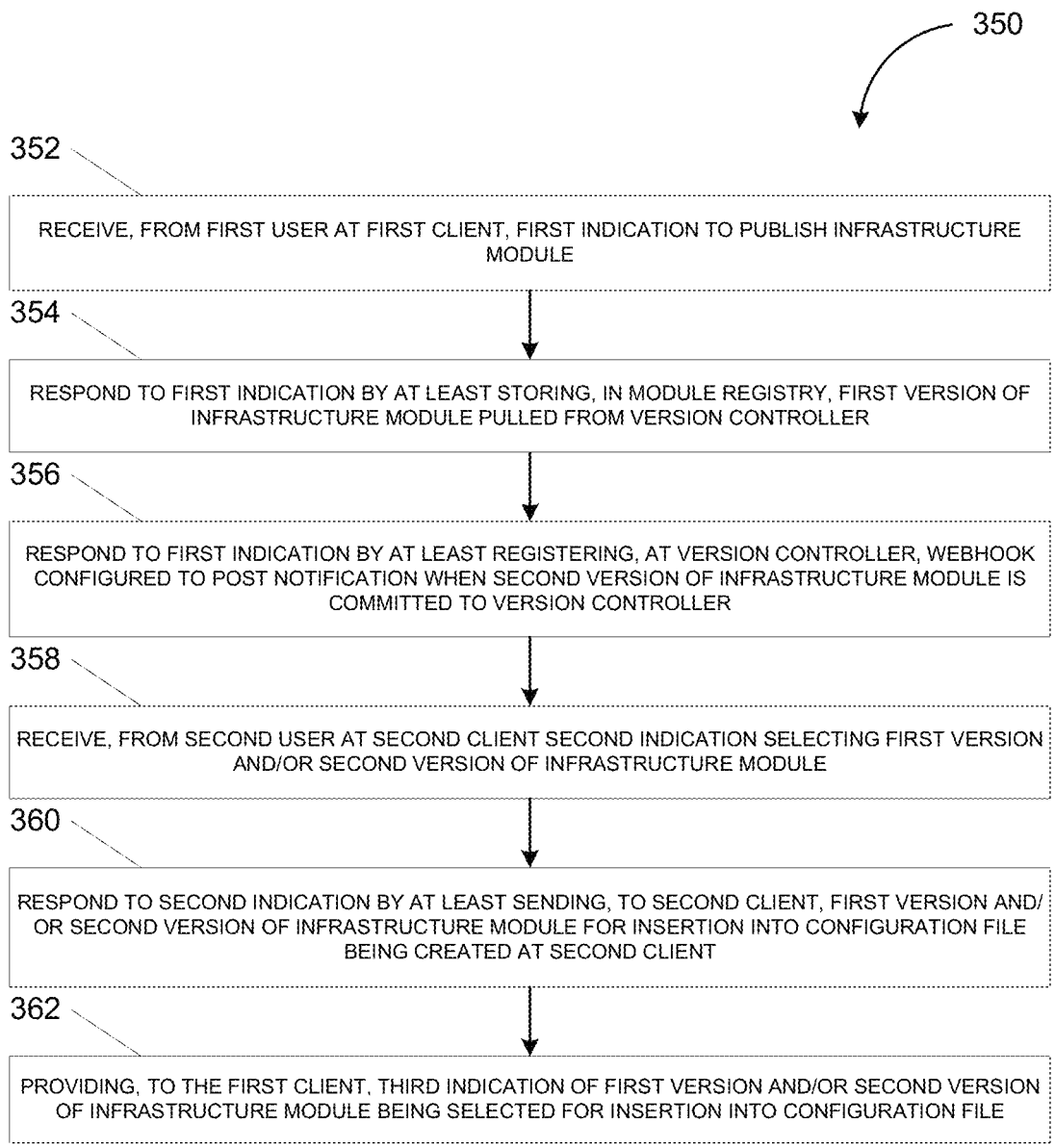
FIG. 3C depicts a flowchart illustrating a process for configuring an information technology infrastructure, in accordance with some example embodiments.

FIG. 3C depicts a flowchart illustrating a process 350 for configuring the information technology infrastructure 130, in accordance with some example embodiments. Referring to FIGS. 1A-C, 2, and 3C, the process 350 may be performed by the information technology infrastructure controller 110 to enable the generation of the first configuration file 125a and/or the second configuration file 125b. As noted, the first configuration file 125a and/or the second configuration file 125b may be merged into the first workspace 165a, the second workspace 165b, and/or the third workspace 165c. Meanwhile, the execution plan 190 may be generated based at least on the configurations associated with the first workspace 165a, the second workspace 165b, and/or the third workspace 165c.

The information technology infrastructure controller 110 may receive, from the first user 145a at the first client 120a, a first indication to publish an infrastructure module (352). For example, while creating the first configuration file 125a at the first client 120a, the first user 145a may create the first module 116a and/or the second module 116b. The first module 116a and the second module 116b may each include the configurations that may be applied to the information technology infrastructure 130 to achieve, at least partially, an information technology objective such as, for example, support for a software application, a multi-tier software application, self-service clusters, software demonstrations, disposable environments (e.g., production environments, staging environments, and/or the like), software defined networking, resource schedulers, multi-cloud deployment, and/or the like. By publishing the first module 116a and/or the second module 116b, the first user 145a may render the first module 116a and/or the second module 116b available for use by other users including, for example, the second user 145b at the second client 120b.

The information technology infrastructure controller 110 may respond to the first indication by at least storing, in the module registry 115, a first version of the infrastructure module pulled from the version controller 140 (354). Furthermore, the information technology infrastructure controller 110 may respond to the first indication by at least registering, at the version controller 140, a webhook configured to post, to the information technology infrastructure controller 110, a notification when a second version of the infrastructure module is committed to the version controller 140 (356). In some example embodiments, the first module 116a and/or the second module 116b may be published may be published via the version controller 140. Publishing the first module 116a and/or the second module 116b via the version controller 140 may include registering, at the version controller 140, a webhook (e.g., a hypertext transfer protocol (HTTP) callback) configured to post, to the information technology infrastructure controller 110, a notification whenever a different version of the first module 116a and/or the second module 116b is committed to the version controller 140. As such, the information technology infrastructure controller 110 may be able to update the module registry 115 whenever, for example, the first user 145a creates another version of the first module 116a and/or the second module 116b. The update to the module registry 115 may include, for example, incrementing the version number associated with the first module 116a and/or the second module 116b. Moreover, the second user 145b may have access to multiple versions of the first module 116a and/or the second module 116b including, for example, the most recent versions of the first module 116a and/or the second module 116b.

It should be appreciated that the module registry 115 may be associated with the organization 155 such that only users from the organization 155 may have access to the module registry 115, for example, to publish modules, consume modules, and/or the like. As such, the first user 145a may be able to publish the first module 116a and/or the second module 116b only if the first user 145a is associated with the organization 155. Alternatively and/or additionally, access to the module registry 115 may be role and/or permission based such that the first user 145a may publish the first module 116a and/or the second module 116b to the module registry 115 only if the first user 145a is associated with the appropriate role and/or permissions The information technology infrastructure controller 110 may receive, from the second user 145b at the second client 120b, a second indication selecting the first version and/or the second version of the infrastructure module (358). The information technology infrastructure controller 110 may respond to the second indication by at least sending, to the second client 120b, the first version and/or the second version of the infrastructure module for insertion into a configuration file being created at the second client 120b (360). For example, while creating the second configuration file 125b at the second client 120, the second user 145b may select to add, to the second configuration file 125b, the first module 116a and/or the second module 116b. The second user 145b may select to add the first module 116a and/or the second module 116b instead of and/or in addition to creating the corresponding configurations. The first module 116a and/or the second module 116b may be added to the second configuration file 125b in order to achieve, at least partially, an information technology objective such as, for example, support for a software application, a multi-tier software application, self-service clusters, software demonstrations, disposable environments (e.g., production environments, staging environments, and/or the like), software defined networking, resource schedulers, multi-cloud deployment, and/or the like.

As noted, the module registry 115 may be associated with the organization 155 such that only users from the organization 155 may have access to the module registry 115, for example, to publish modules, consume modules, and/or the like. As such, the second user 145b may access the module registry 115 to consume the first module 116a and/or the second module 116b only if the second user 145b is associated with the organization 155. Alternatively and/or additionally, access to the module registry 115 may be role and/or permission based such that the second user 145b may access the module registry 115 to consume the first module 116a and/or the second module 116b only if the second user 145b is associated with the appropriate role and/or permissions. The role and/or permissions associated with the second user 145b may further determine whether the second user 145b is able to consume certain modules from the module registry 115. For example, the role and/or permissions associated with the second user 145b may allow the second user 145b to consume the first module 116a but not the second module 116b.

The information technology infrastructure controller 110 may provide, to the first client 120a, a third indication of the first version and/or the second version of the infrastructure module being selected for insertion into the configuration file (362). In some example embodiments, the information technology infrastructure controller 110 may generate and/or update a user interface to display, at the first client 120a, an indication that the first module 116a and/or the second module 116b have been selected for insertion into the second configuration file 125b. For example, the indication may identify the second user 145b at the second client 120b as having selected the first module 116a and/or the second module 116b. Moreover, if the second configuration file 125b is merged into the first workspace 165a, the indication from the information technology infrastructure controller 110 may further identify the first workspace 165a as having the first module 116a and/or the second module 116b.

Figure 4A:
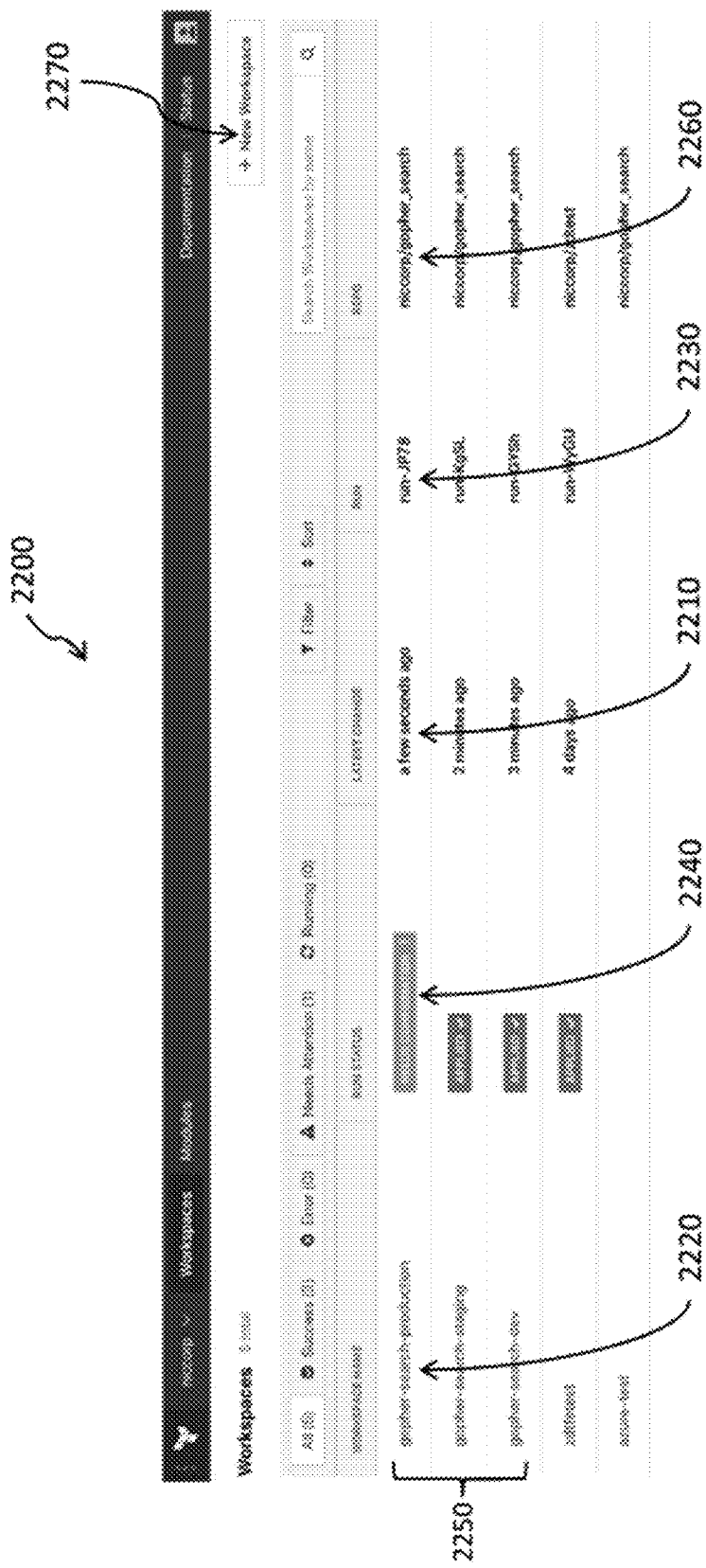
FIG. 4A depicts an example of a user interface for creating and configuring a workspace, in accordance with some example embodiments.
Figure 4B:
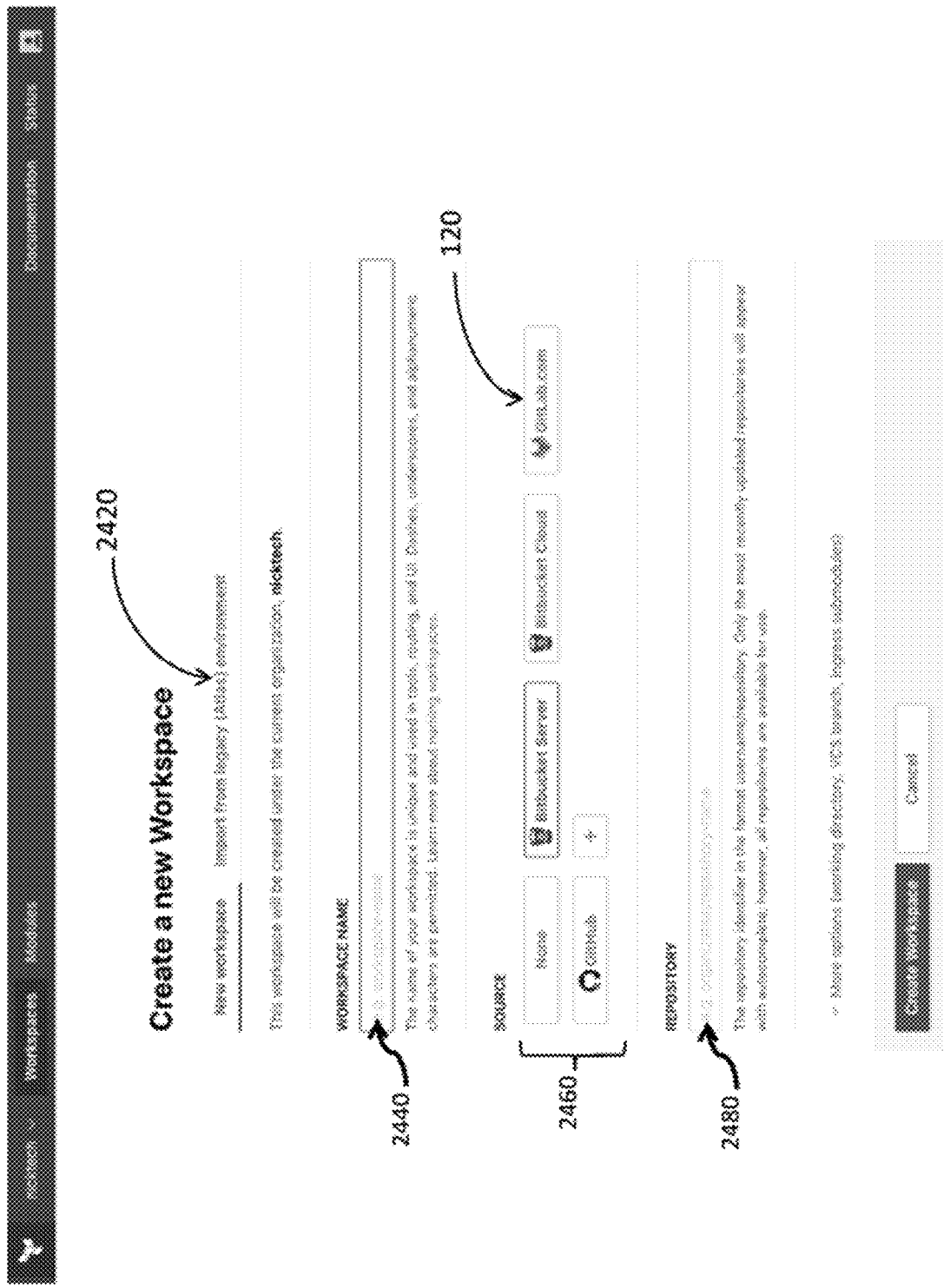
FIG. 4B depicts an example of a user interface for creating and configuring a workspace, in accordance with some example embodiments.
Figure 4C:
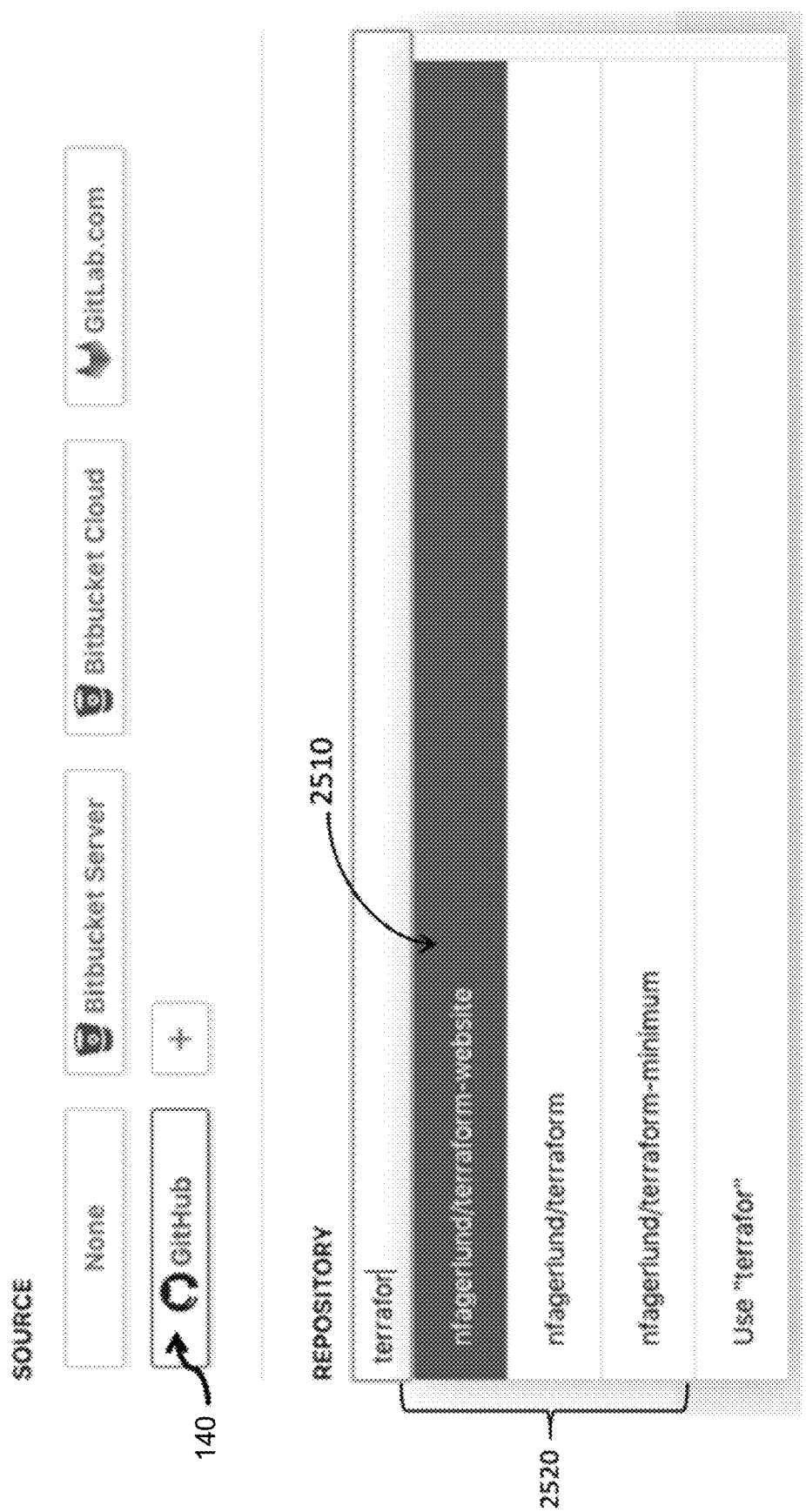
FIG. 4C depicts an example of a user interface for creating and configuring a workspace, in accordance with some example embodiments.
Figure 4D:
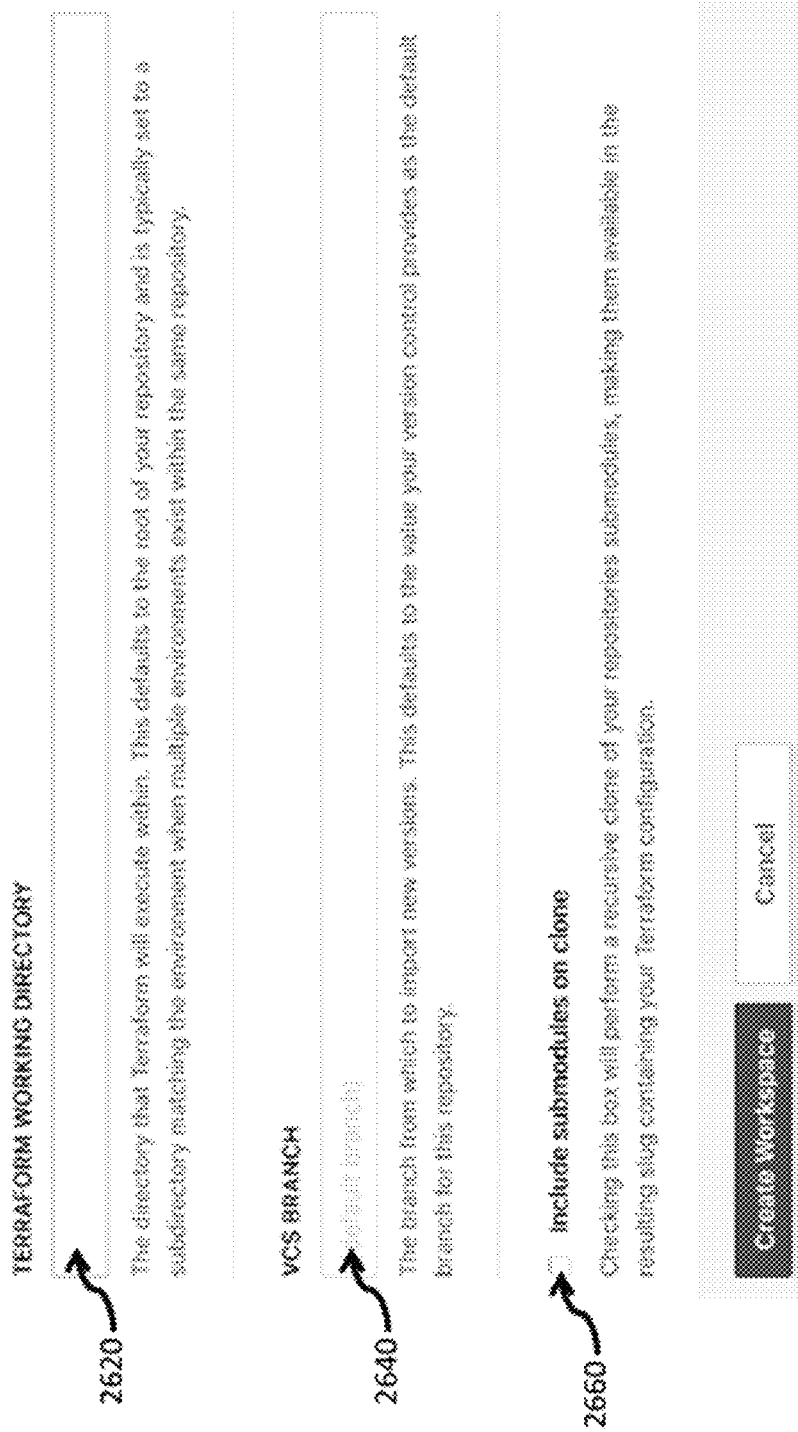
FIG. 4D depicts an example of a user interface for creating and configuring a workspace, in accordance with some example embodiments.
Figure 4E:
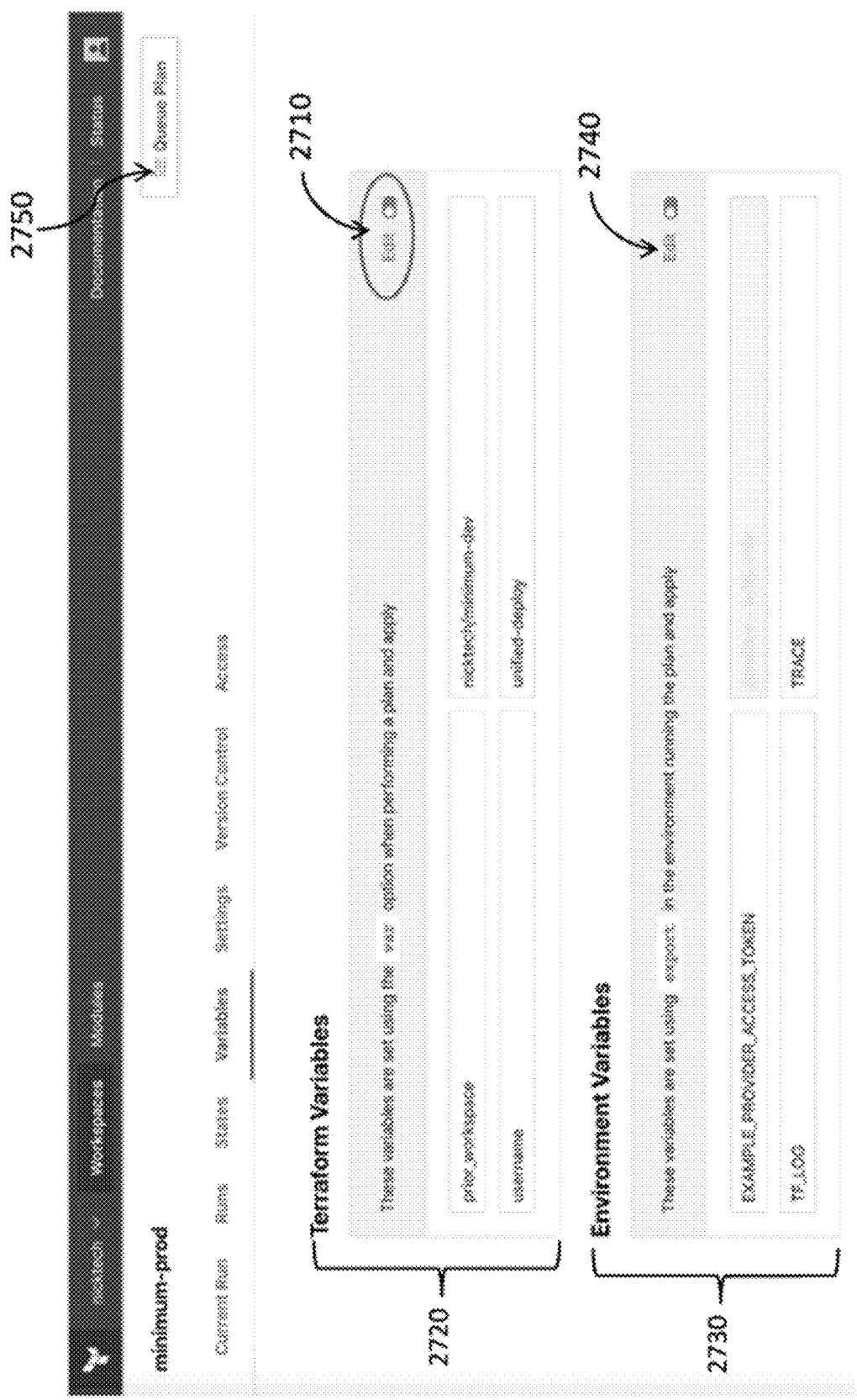
FIG. 4E depicts an example of a user interface for creating and configuring a workspace, in accordance with some example embodiments.
Figure 4F:
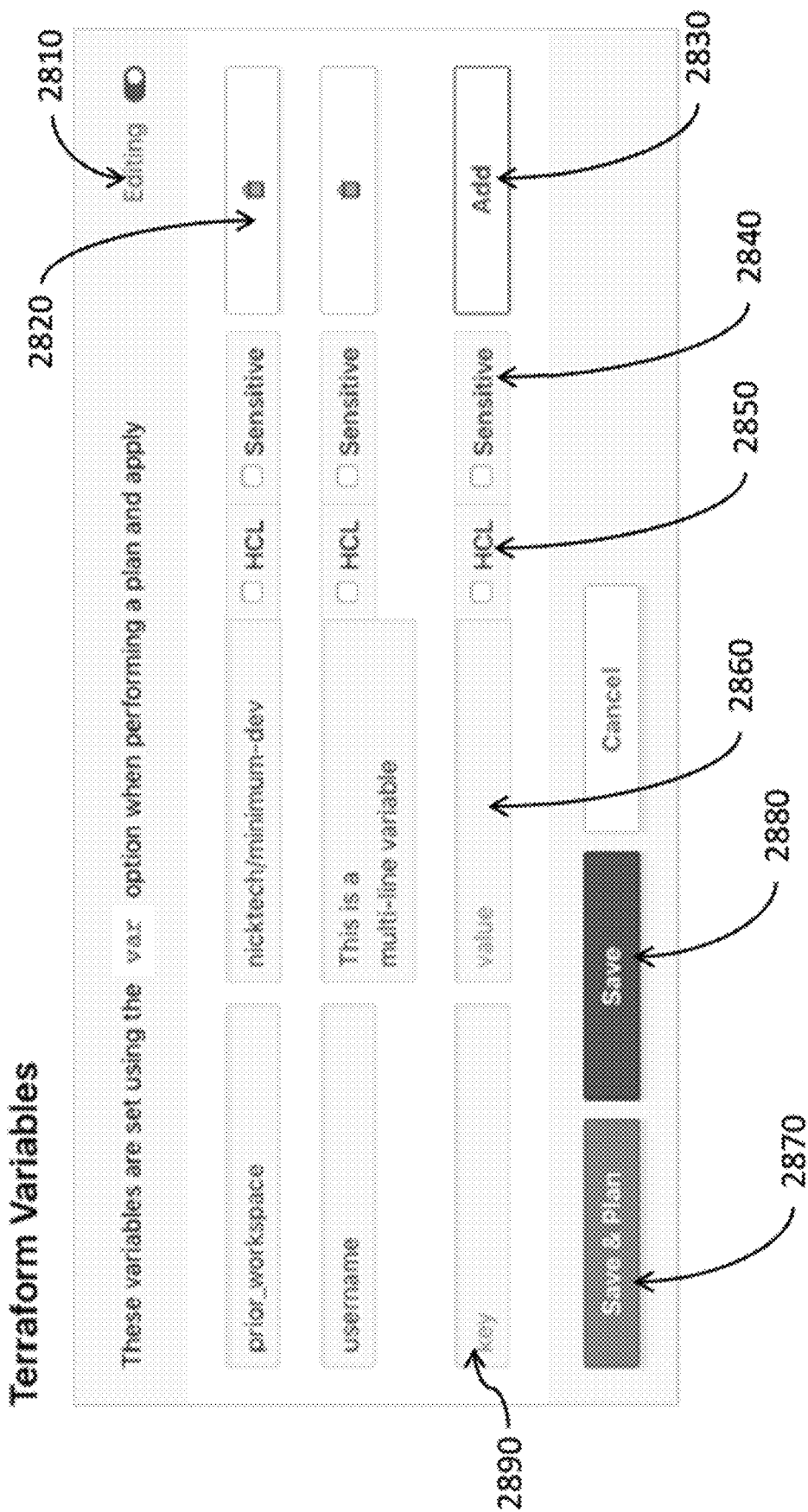
FIG. 4F depicts an example of a user interface for creating and configuring a workspace, in accordance with some example embodiments.
Figure 4G:
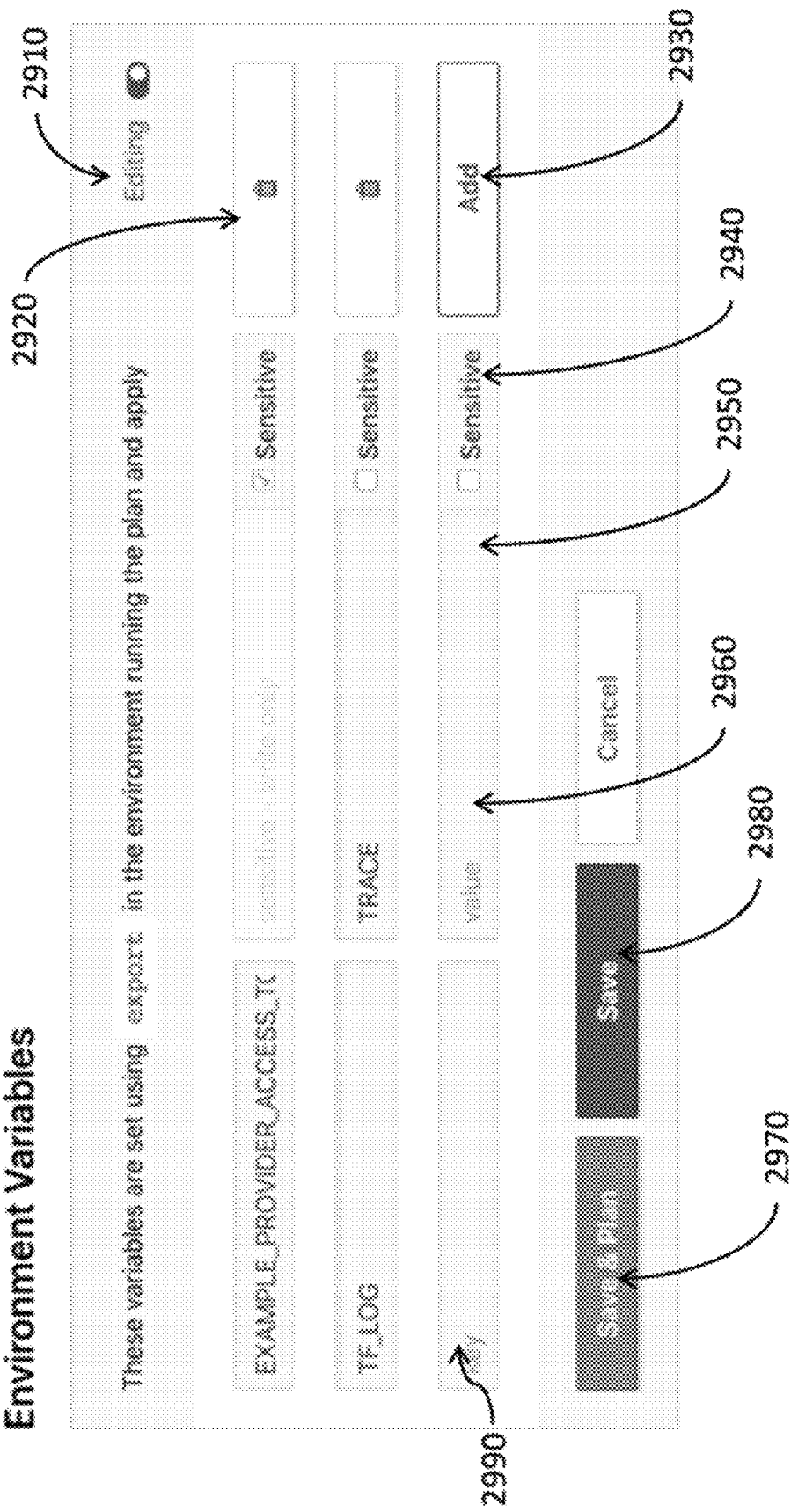
FIG. 4G depicts an example of a user interface for creating and configuring a workspace, in accordance with some example embodiments.
Figure 4H:
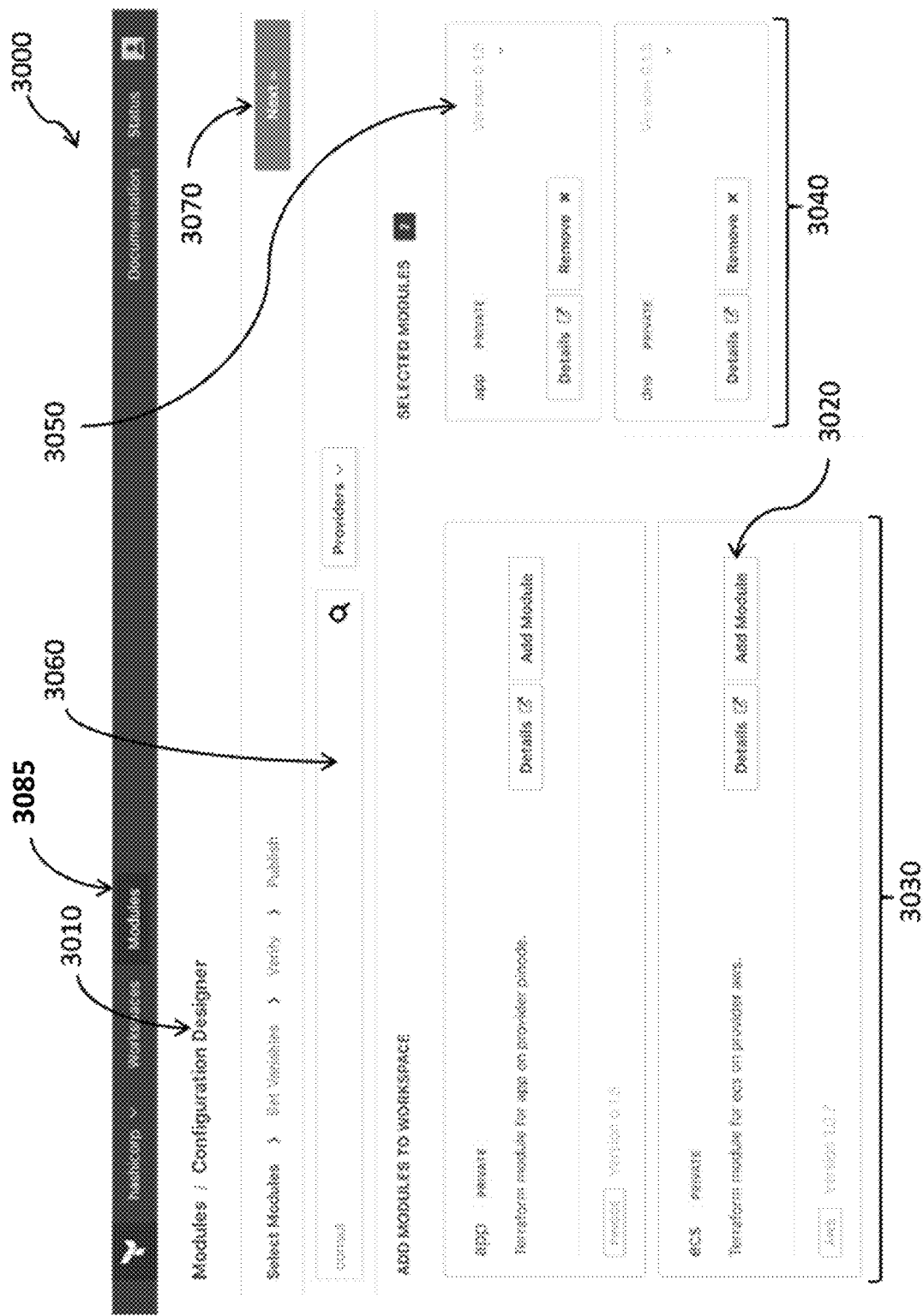
FIG. 4H depicts an example of a user interface for creating and configuring a workspace, in accordance with some example embodiments.
Figure 4I:
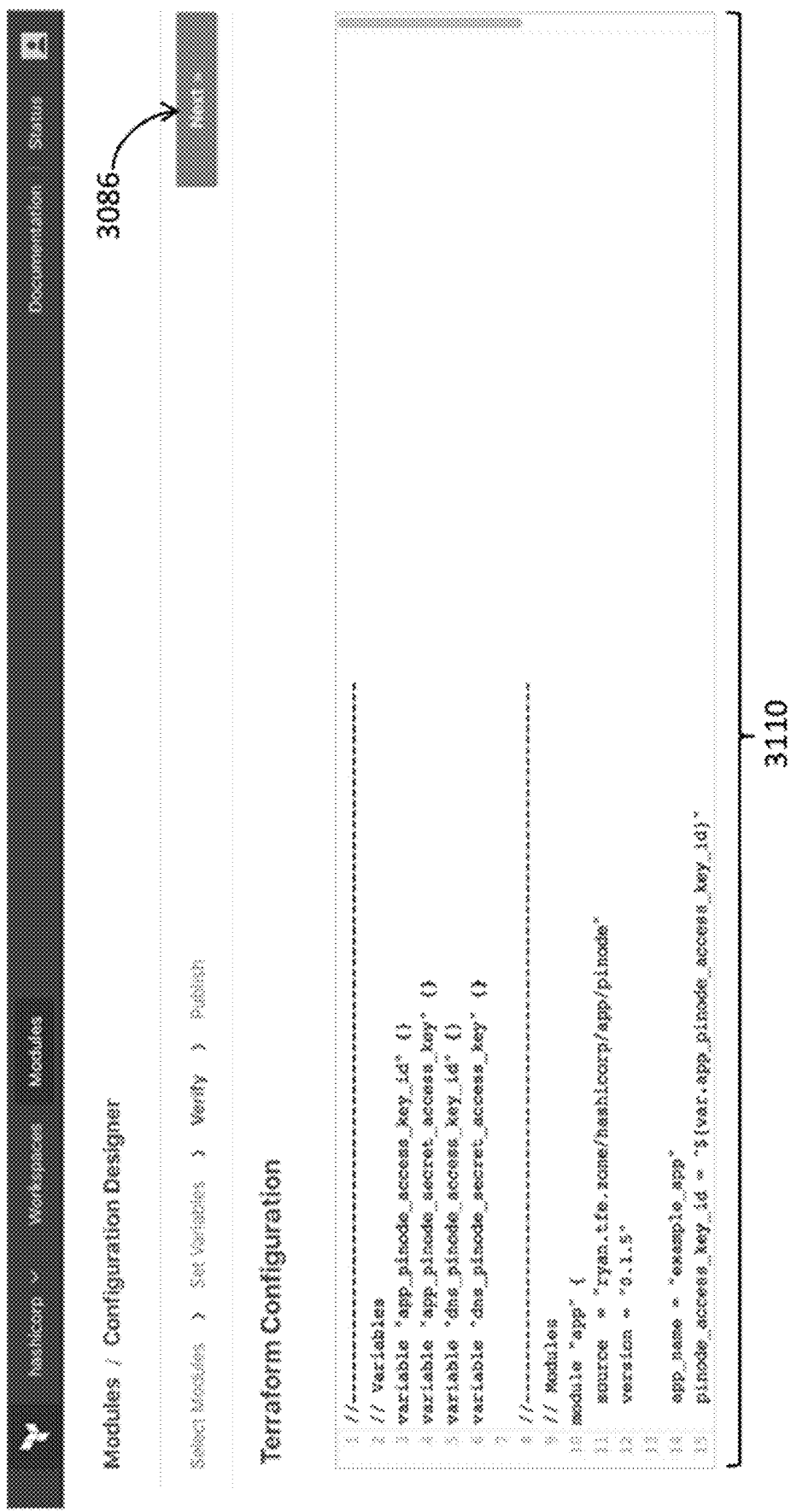
FIG. 4I depicts an example of a user interface for creating and configuring a workspace, in accordance with some example embodiments.
Figure 4J:
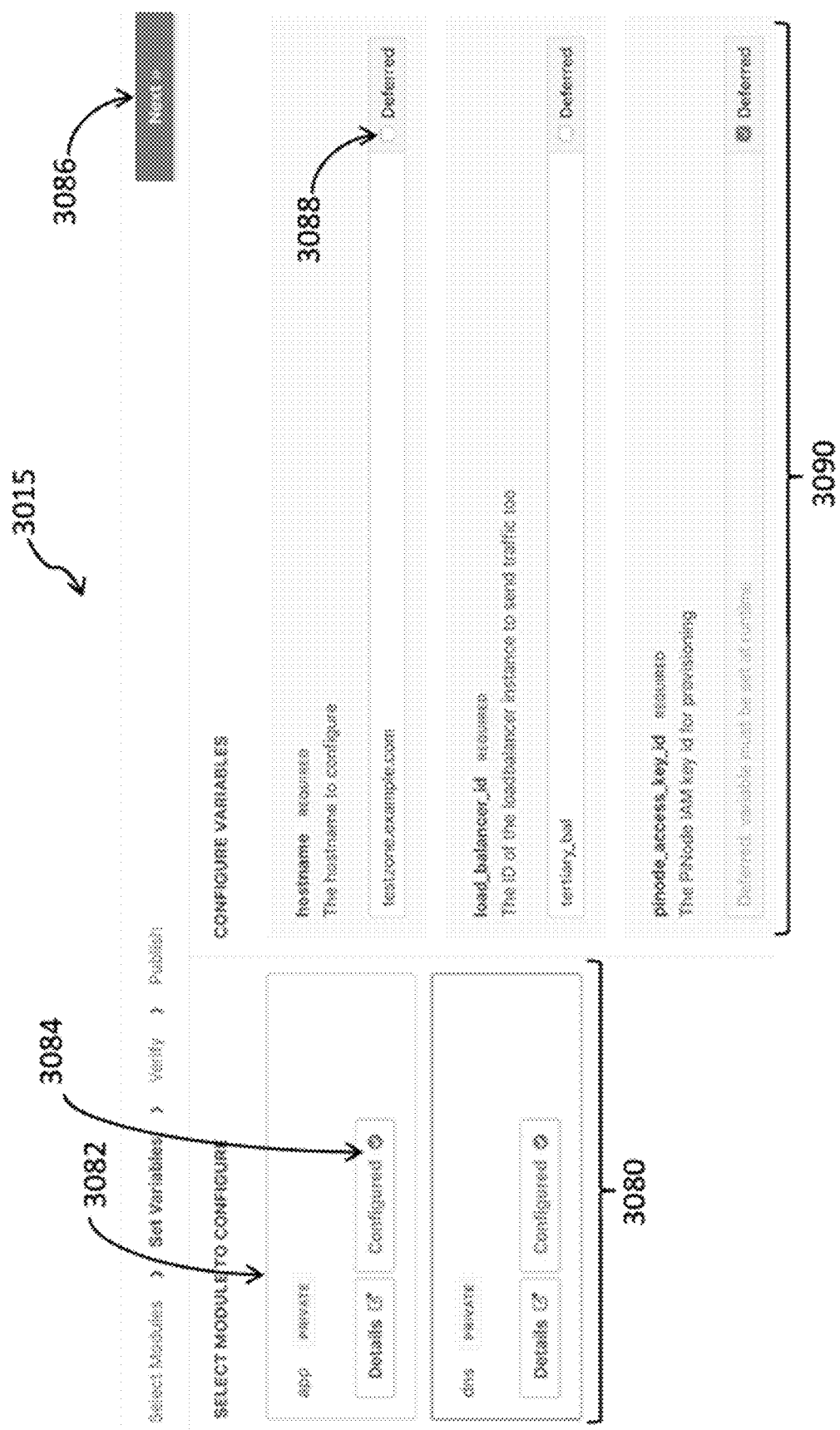
FIG. 4J depicts an example of a user interface for creating and configuring a workspace, in accordance with some example embodiments.
Figure 4L:
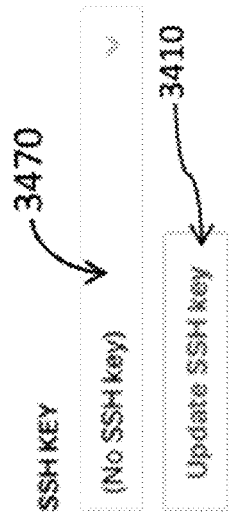
FIG. 4L depicts an example of a user interface for creating and configuring a workspace, in accordance with some example embodiments.
Figure 4L:
Figure 4M:
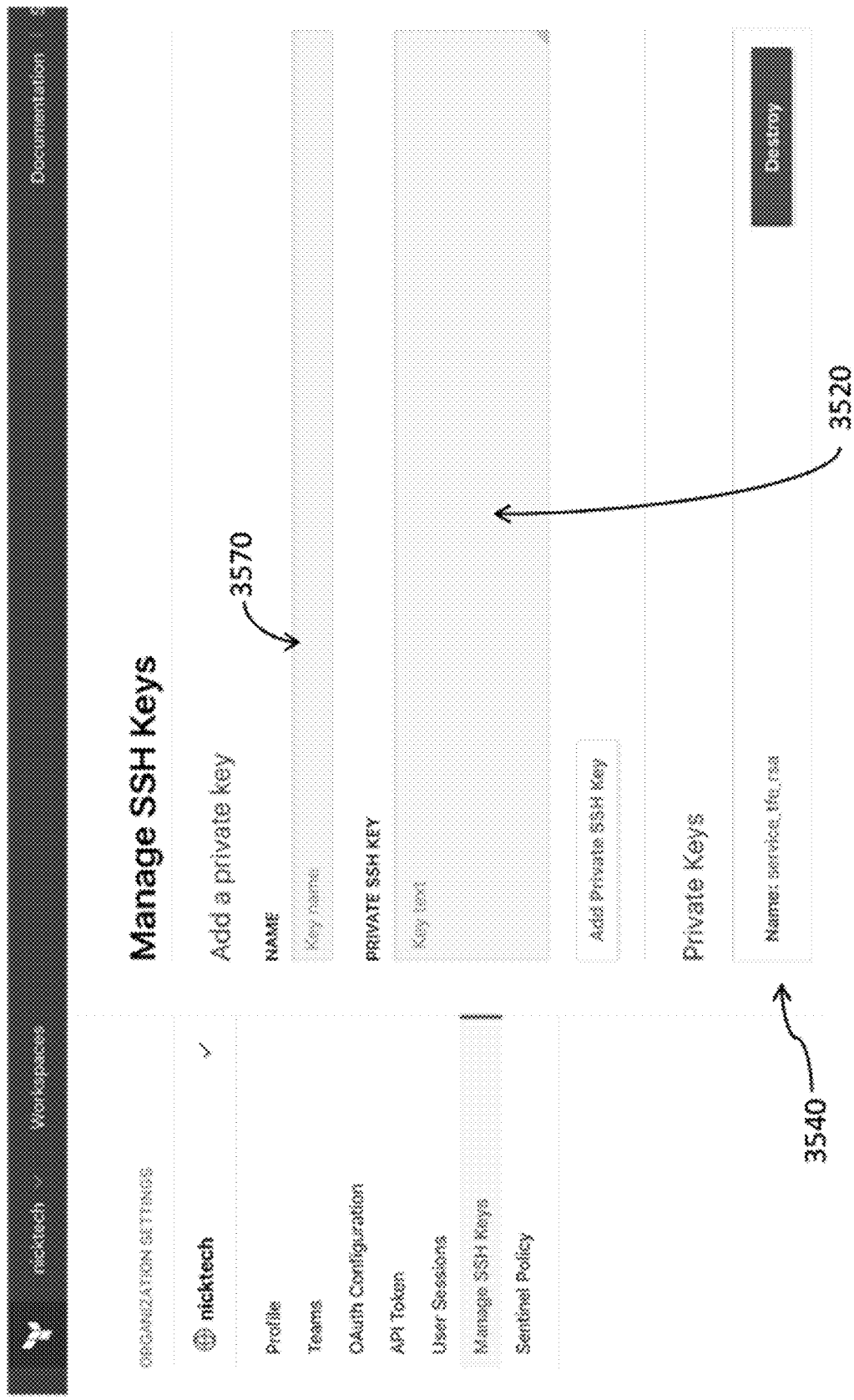
FIG. 4M depicts an example of a user interface for creating and configuring a workspace, in accordance with some example embodiments.
Figure 4N:
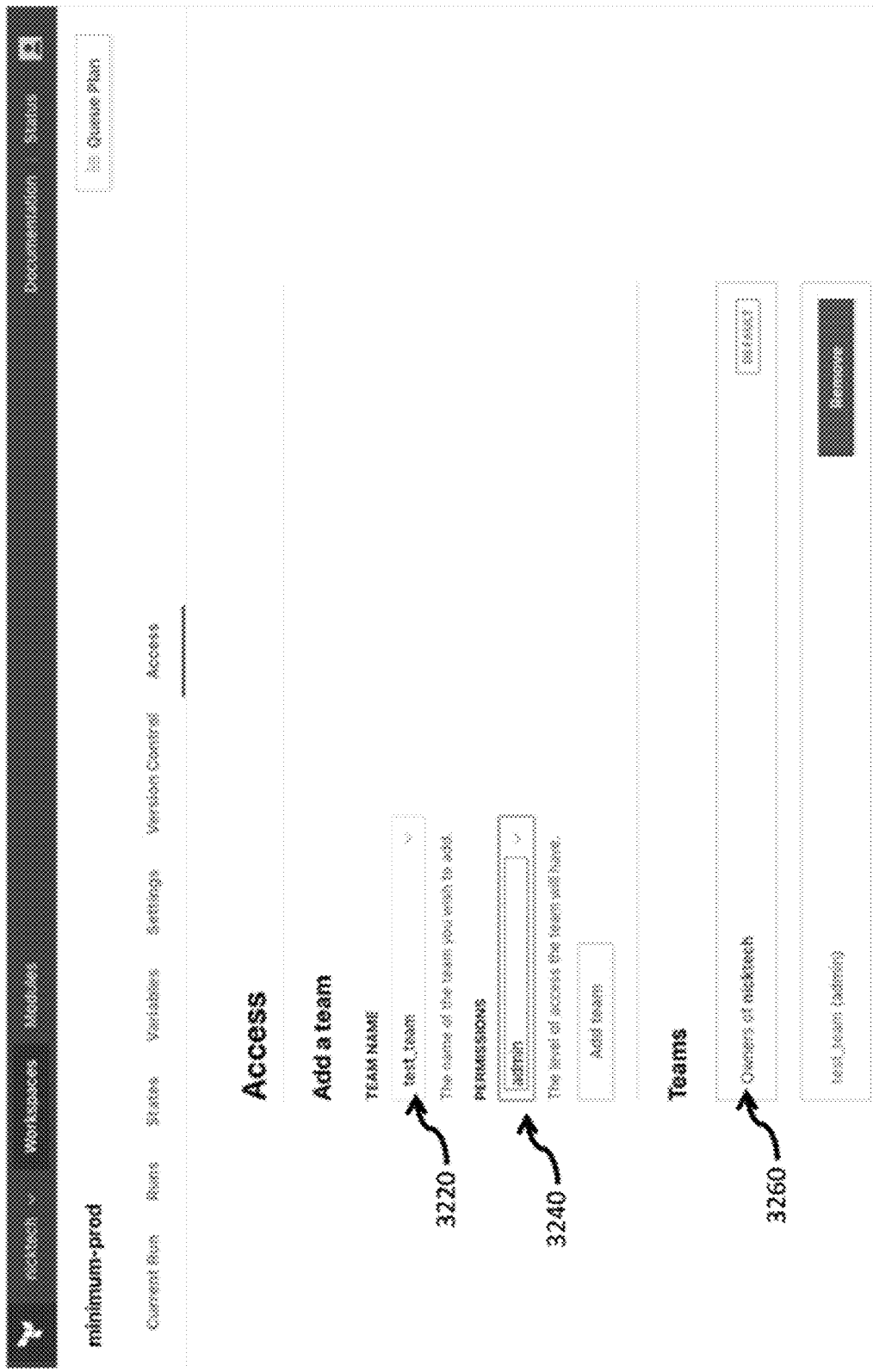
FIG. 4N depicts an example of a user interface for creating and configuring a workspace, in accordance with some example embodiments.

FIGS. 4A-N depict examples of user interfaces for creating and configuring a workspace, in accordance with some example embodiments. Referring to FIGS. 1A-C and 4A-P, the first user 145a at the first client 120a and/or the second user 145b at the second client 120b may interact with the user interfaces shown in FIGS. 4A-N to create and/or configure the first workspace 165a, the second workspace 165b, and/or the third workspace 165c.

Referring to FIG. 4A, a new workspace may be created by clicking on a tab 2270. Alternatively and/or additionally, a workspace may also be imported by clicking on a second tab 2420 shown in FIG. 4B, which may be trigger the migration of legacy environments to a new organization while preserving their existing state and settings. A workspace may also be created using a configuration designer 3010 shown in FIGS. 4H-J.

Referring again to FIG. 4B, a workspace name may be entered in a field 2440. The workspace name may be unique and selected by combining one or more distinguishing attributes including, for example, the resources being managed, the environment in which the resources run, the region into which the resources are provisioned, and/or the like. The user interface shown in FIG. 4B may include a selection of sources 2460, which may include, for example, the version controller 140. Meanwhile, as shown in FIGS. 4B-C, the user interface may further provide a selection of repositories 2520 at, for example, the version controller 140 from which the information technology infrastructure controller 110 may pull the first configuration file 125a and/or the second configuration file 125b.

Referring to FIG. 4D, the first user 145a at the first client 120a and/or the second user 145b at the second client 120b may select a directory 2620 in which the information technology infrastructure controller 110 may run the execution plan 190. The directory 2620 may be specified as a relative path from a root of the repository 2510 and set to a subdirectory matching a particular environment (e.g., production, staging, development, and/or the like) if multiple environments exist within the same repository 2510. A version control branch 2640 of the repository for the workspace may also be selected, which may refer to a production branch, a staging branch, and/or a development branch. Furthermore, the first user 145a at the first client 120a and/or the second user 145b at the second client 120b may indicate, by selecting a box 2660, whether to recursively clone all of the submodules within the repository 2510 when fetching a configuration.

Referring to FIGS. 4E-G, a workspace may include different types of variables. For example, the workspace may include variables may defining the parameters for a configuration and environment variables affecting a behavior of the information technology infrastructure controller 110. Alternatively and/or additionally, the workspace may include shell environment variables used, for example, by the first provider 150a and/or the second provider 150b, for credentials and/or other data. If a required variable is missing, an execution plan in the workspace may fail and a corresponding run log may be updated accordingly. Variables in the workspace may be identified in any manner including, for example, by reviewing programming code and/or documentation.

Variables in a workspace may be edited either via the example of the user interface shown in FIGS. 4E-G and/or via an application programming interface (API). Variables may also be uploaded via, for example, the first configuration file 125a and/or the second configuration file 125b. For large quantities of complex variables, a command line interface (CLI) tool may be used to update the variables in the workspace using a local variables file.

FIGS. 4E-G further depict how the variables of the workspace may be edited using a first button 2710 and/or a second button 2740. In particular, FIGS. 4F-G depict examples of the user interface when a first variable 2810 and a second variable 2910 are in an editing mode. New variables may also be added by completing the field 2890 and/or the field 2990 before clicking the button 2830 and/or the button 2930. Variables may also be removed by clicking on the button 2820 and/or the button 2920. Where the field 2860 and/or the field 2960 contain sensitive values (e.g., passwords, keys, and/or the like), these values may be securely stored by checking the box 2840 and/or the box 2940.

It should be appreciated that marking a variable as sensitive may limits how the first user 145a at the first client 120a and/or the second user 145b at the second client 120b may interact with the variable. For example, no user including, for example, the user who created and/or modified the variable, may view and/or modify the value of the variable, whether displayed in a user interface and/or retrieved via an application programming interface (API). Instead, modifying a sensitive variable may require deleting the existing variable and creating a new variable. The values of at least some variables may be encrypted prior to being stored, for example, as part of the workspace.

FIG. 4H depicts the configuration designer 3010 used to outline a configuration for a new workspace, which may include, selecting from the module registry 115, the first module 116a, the second module 116b, and/or the like. The variables of the selected module may be listed as a fillable hypertext markup language (HTML) form, with a helper interface for finding interpolatable values. Once completed, the configuration designer 3010 may return the first configuration file 125a and/or the second configuration file 125b, which may subsequently merged into the workspace.

To select and/or add, for example, to the second configuration file 125b, the first module 116a and/or the second module 116b, the second user 145b at the second client 120b may navigate to a list of modules using the button 3085. The "Select Modules" page 3000 may display a filterable and/or searchable list 3030 of at least a portion of the modules available from the module registry 115. Any quantity of modules from the filterable and/or searchable list 3030 may be added to by clicking the button 3020. List 3040 may display a list of the selected modules.

By default, selecting a module may add the most recent version of the module, for example, to the second configuration file 125b. A different version of the module may be selected by clicking on the module's version number 3050 in the list 3040. The "Set Variables" page 3015 shown in FIG. 4J may be accessed by clicking the button 3070. The "Set Variables" page 3015 may display a variables list 3090 for the module 3082 selected from the list 3080. The variables list 3090 of the module 3082 may be viewed by clicking the button 3084. Each variable may be labeled as required or optional. Once a value is set for all of a module's required variables, the button 3084 may change to a "configured" button. When all modules are configured, FIG. 4I shows that the finished configuration may be viewed by clicking the button 3086.

As shown in FIG. 4J, one user may delegate the setting and/or modifying of a variable in a module to another users by selecting a "deferred" checkbox, which ties the value of the variable to a new top-level variable having no default value. Anyone creating a workspace using the module may have an opportunity to provide a value for the delegated variable. Once complete, the first configuration file 125a and/or the second configuration file 125b may be viewed by clicking the button 3086. The corresponding code may be copied into a text editor, saved as a main.tf file in a new directory, and committed to the version controller 140 to enable subsequent merging into a corresponding workspace. Additional changes to the first configuration file 125a and/or the second configuration file 125b may be made without selecting and adding existing modules from the module registry 115.

Referring to FIG. 4K, only team 420 with administrative access for a workspace may make changes to settings of the workspace. The information technology infrastructure controller 110 may be configured to automatically apply the execution plan 190 by selecting the auto apply option. When the auto apply option is selected, the information technology infrastructure controller 110 may automatically apply, to the information technology infrastructure 130, the configurations associated with the execution plan 190, for example, when the execution plan 190 is successfully validated. By contrast, if the manual apply option is selected, the first user 145a at the first client 120a and/or the second user 145b at the second client 120b may be required to provide a confirmation before the configurations associated with the execution plan 190 are applied to the information technology infrastructure 130.

Referring to FIG. 4L, if a key is required for the repository linked to the workspace, then a unique identifier associated with the key may be selected in the field 3470. Clicking the button 3410 may update the key, which may be modified by the first user 145a and/or the second user 145b if the first user 145a and/or the second user 145b have administrative access. The information technology infrastructure controller 110 may use the key for cloning modules used during one or more runs of the execution plan 190. As used here, the key may refer to, for example, a secure shell (SSH) key.

A workspace may be locked and/or unlocked by the first user 145a and/or the second user 145b if the first user 145a and/or the second user 145b has write access or administrative access. Locking a workspace may prevent users with write access from manually queuing runs, prevent automatic runs due to the first configuration file 125a and/or the second configuration file 125b being committed to the version controller 140, prevent creation of runs via an application programming interface (API), prevent creation of runs using a command line interface (CLI) tool, and/or the like. To enable runs, the workspace may be unlocked via the toggle button 3430.

In some example embodiments, having administrative access may enable the first user 145a and/or the second user 145b to delete a workspace. Before deleting the workspace, the first user 145a and/or the second user 145b may set the environment variable "CONFIRM_DESTROY" to "1" for the workspace and queue a destroy plan. Queuing a destroy plan may destroy the resources in the information technology infrastructure 130 managed by the workspace. It should be appreciated that resources must be destroyed before deleting a corresponding workspace. Otherwise, if the resources are not destroyed before deleting the workspace, these resources may become unmanaged and may require destruction by the first provider 150a and/or the second provider 150b.

In some example embodiments, the information technology infrastructure controller 110 may store one or more keys (e.g., secure shell (SSH) keys) such that the keys may be used in that clones modules from a server that requires credentials such as, for example, the version controller 140. The information technology infrastructure controller 110 may manage the keys used to clone modules at the organization level and may allow multiple keys to be associated with, for example, the organization 155. Keys may be added or deleted via organizational settings. Once a key is uploaded, the text of the key may be hidden from the first user 145a at the first client 120a and/or the second user 145b at the second client 120b.

The first user 145a and/or the second user 145b may set up an organizational key using, for example, the user interface shown in FIG. 4M. For example, as shown in FIG. 4M, to add a key (e.g., a secure shell (SSH) key) to the information technology infrastructure controller 110, the first user 145a and/or the second user 145b may obtain a key pair that the information technology infrastructure controller 110 may use to download one or more modules (e.g., the first module 116a, the second module 116b, and/or the like) during the running, for example, of the execution plan 190. A key pair may be created using the following command: ssh-keygen -t rsa -f "/Users/<NAME>/.ssh/service_tfe"-C "service_terraform_enterprise"

The command above may create a service_tfe file with a private key as well as a service_tfe.pub file with the public key. The public key may be distributed, for example, to the version controller 140. Meanwhile, as shown in FIG. 4M, a unique identifier for the private key 1040 may be entered in the field 3570 and the text of the private key 1040 may be entered in the field 3520 before the private key 1040 may be added by clicking the "Add Private SSH Key" button. Upon adding the private key 1040, the key may appear in the list of keys 3740, which may list the private key 1040 using the unique identifier 1062 of the private key 1040. While the information technology infrastructure controller 110 may retain the text of the private key 1040, the text of the private key 1040 may remain hidden from the first user 145a and/or the second user 145b.

Furthermore, FIGS. 4N-M show that to delete a key (e.g., a secure shell (SSH) key), the first user 145a and/or the second user 145b may replace the key in the field 3470 in the workspace settings of the workspaces that use the key with another key. The first user 145a and/or the second user 145b may further click the "Destroy" button next to the keys' unique identifier in the list of keys 3740.

As noted, the first user 145a and/or the second user 145b may have access (e.g., read access, write access, administrative access, and/or the like) to a workspace by being associated with a team having access to the workspace. As shown in FIG. 4M, a team may be accorded access to the workspace by being added to the workspace and by setting the access privileges associated with the team. Each workspace may be associated with at least one team (e.g., the team 3260) that has full access to the workspace including, for example, read access, write access, administrative access, and/or the like. Removing a team from a workspace may remove the team's access to the workspace.

Figure 5A:
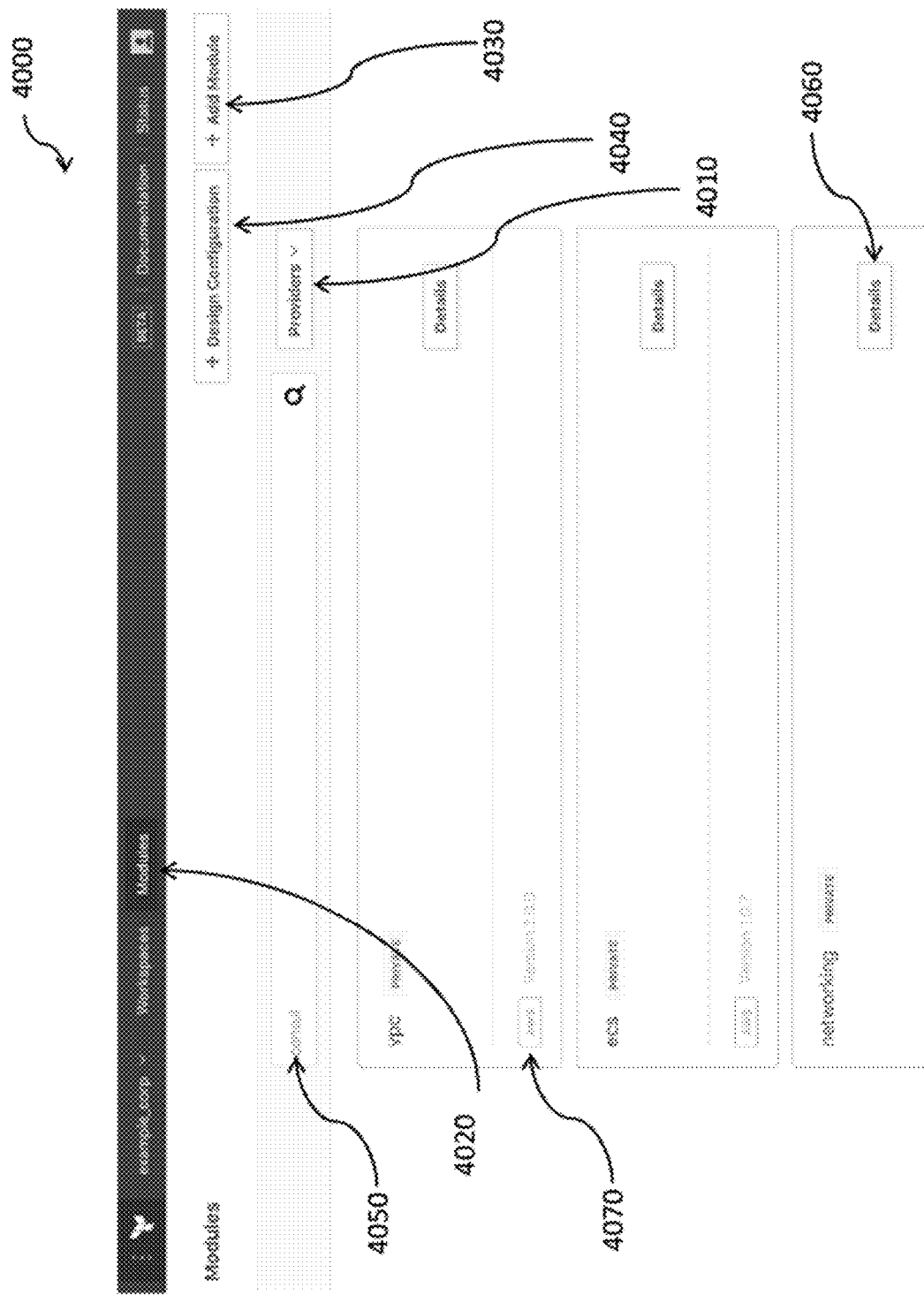
FIG. 5A depicts an example of a user interface for managing modules, in accordance with some example embodiments.

Referring now to FIG. 5A, all users in the organization 155 (e.g., the first user 145a, the second user 145b, and/or the like) may view the module registry 115, which may be associated exclusively with the organization 196. Alternatively, one or more of the modules in the module registry 115 may only be visible to some users or groups of users within the organization 155 but remain hidden from others users or groups of users within the organization 155. In some example embodiments, a workspace associated with the organization 155 may only be permitted to use modules associated with the organization 155. For a module to be available to users from more than one organization, the same module may be added to the module registry of each organization.

As shown in FIG. 5A, a list of available modules for an organization may be accessed by clicking the button 4020 in the main navigation bar. The modules page 4000 may list the available modules for an organization. The drop-down 4010 may be used to filter the list to show modules for one or more selected providers. The field 4050 may be used to enter a search for modules by keyword. The details associated with a module may be viewed by clicking the button 4060. The dropdown 4070 may be used to switch between different versions of the same module. Selecting the tabs 4110 may provide detailed documentation for each version of a module. Any module from an organization's module registry may be added to a configuration file such as, for example, the first configuration file 125a, the second configuration file 125b, and/or the like. Table 6 below depicts the syntax for referencing modules in source attributes.

TABLE 6

<TFE HOSTNAME>/<TFE ORGANIZATION>/<MODULE NAME>/<PROVIDER>

As noted, the module registry 115 may allow a corresponding organization to publish configuration modules for consumption by users across an organization 155. The privilege to publish, for example, the first module 116a and/or the second module 116b to the module registry 115 may be limited to certain users and/or certain teams within the organization 155. Once the first module 116a and/or the second module 116b is published to the module registry 115, the version controller 140 may be configured to manage the release of new versions of the first module 116a and/or the second module 116b.

The first module 116a and/or the second module 116b may be published to the module registry 115 of the organization 155 by at least providing the name of a corresponding repository to the information technology infrastructure controller 110. The module registry 115 may use the name of the repository to determine a name and a provider for each of the first module 116 and/or the second module 116b. The module registry 115 may further use the repository's tags to identify one or more available versions of the first module 116 and/or the second module 116b. Furthermore, the module registry may format documentation for each version of the first module 116a and/or the second module 116b based on the corresponding README and/or configurations in the repository. A new version of the first module 116 and/or the second module 116b may be released by pushing a new tag to its repository. The module registry 115 may be update automatically, for example, to include new versions of the first module 116a and/or the second module 116b.

Consumers of a module don't need access to its source repository, the module registry 115 may handle downloads and may further use application programming interface (API) tokens associated with the information technology infrastructure controller 110 to control access to the module registry 115 and/or any infrastructure modules at the module registry 115. Modules can be shared by multiple organizations by sharing the underlying VCS repository. Each organization 155 is granted access to the module's repository and then added to each organization's module registry. When tags are pushed to publish new module versions of the modules, all organizations' registries will update appropriately.

In some example embodiments, a module repository may reside at the version controller 140 while the information technology infrastructure controller 110 may have access (e.g., administrative access) to that repository. Since the module registry 115 may rely on a webhook to import new versions of the first module 116a and/or the second module 116b from the version controller 140, the information technology infrastructure controller 110 may be required to have sufficient access privileges to create the webhook. The first module 116a and/or the second module 116b may be required to conform to a standard structure to enable the module registry 115 to perform inspection, generate documentation, track resource usage, and/or the like.

As shown in FIG. 5A, the first module 116a and/or the second module 116b may be published clicking the button 4030 on the modules page 4000, selecting the version controller 140 the list of VCS providers 4230, entering the name of the repository, and clicking on the button 4210. A new version of the first module 116a and/or the second module 116b may be added by pushing a new version tag to a corresponding repository at the version controller 140. Pushing the new version tag (e.g., v1.0.4 and 0.9.2) may cause the module registry 115 to automatically import the new version of the first module 116a and/or the second module 116b. The module registry 115 may be configured to import new versions of the first module 116a and/or the second module 116b automatically, for example, when new versions of the first module 116a and/or the second module 116b are detected at the VCS providers 4230. Alternatively and/or additionally, the module registry 115 may interact with the VCS provider 4230 periodically to determine whether new versions of the first module 116a and/or the second module 116b have been added to the VCS provider 4230.

Figure 5B:
FIG. 5B depicts an example of a user interface for managing modules, in accordance with some example embodiments.

Referring to FIG. 5B, the first module 116a, the second module 116b, and/or any version thereof may be navigating to the module's details page. Each module's details page may include the button 4120, which may be used to delete a version of the module and/or the module in its entirety. For example, a single version of a module may be deleted by selecting the version of the module to be deleted and then clicking on the button 4120.

Figure 6A:
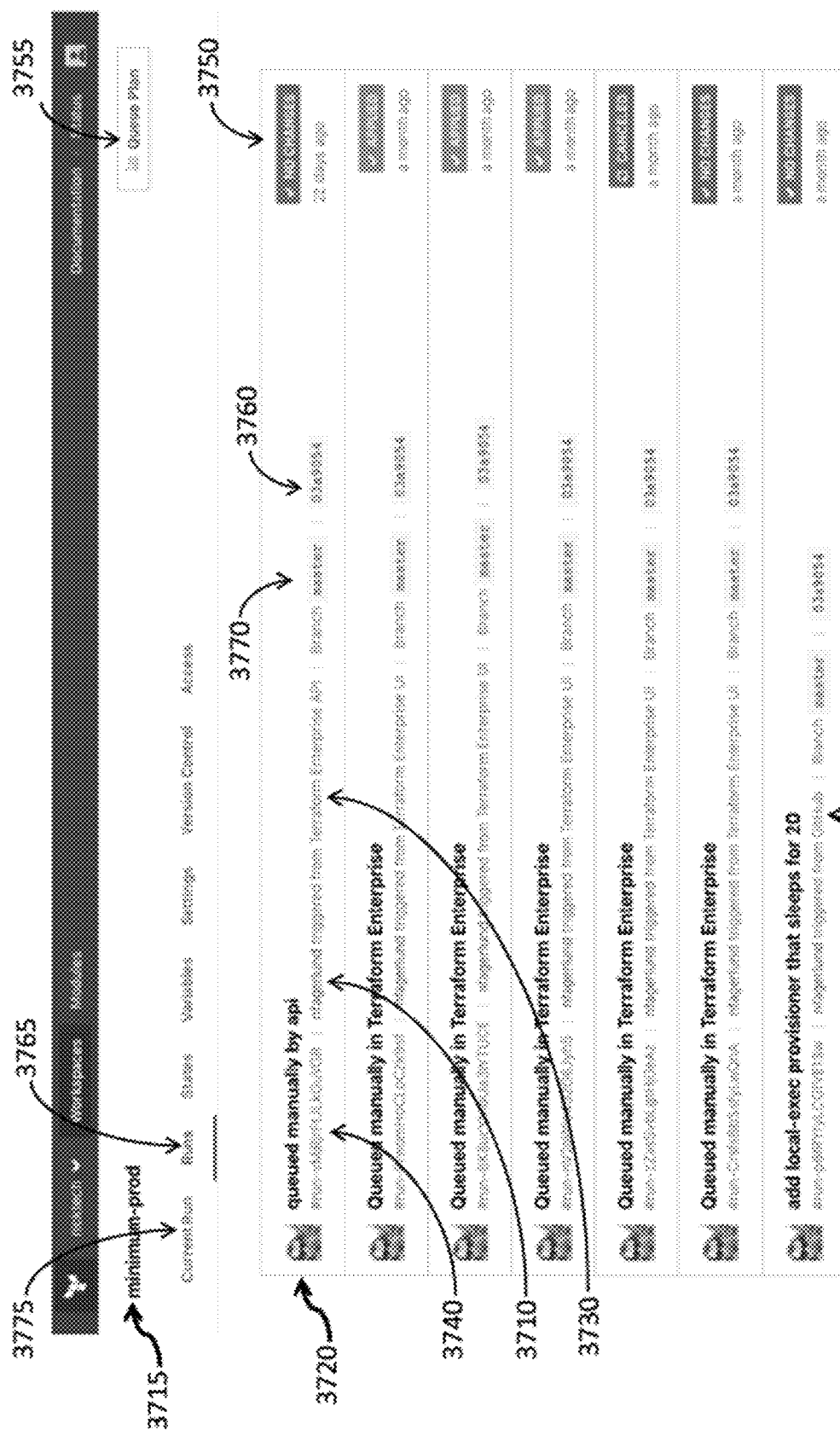
FIG. 6A depicts an example of a user interface for interacting with runs within a workspace, in accordance with some example embodiments.
Figure 6B:
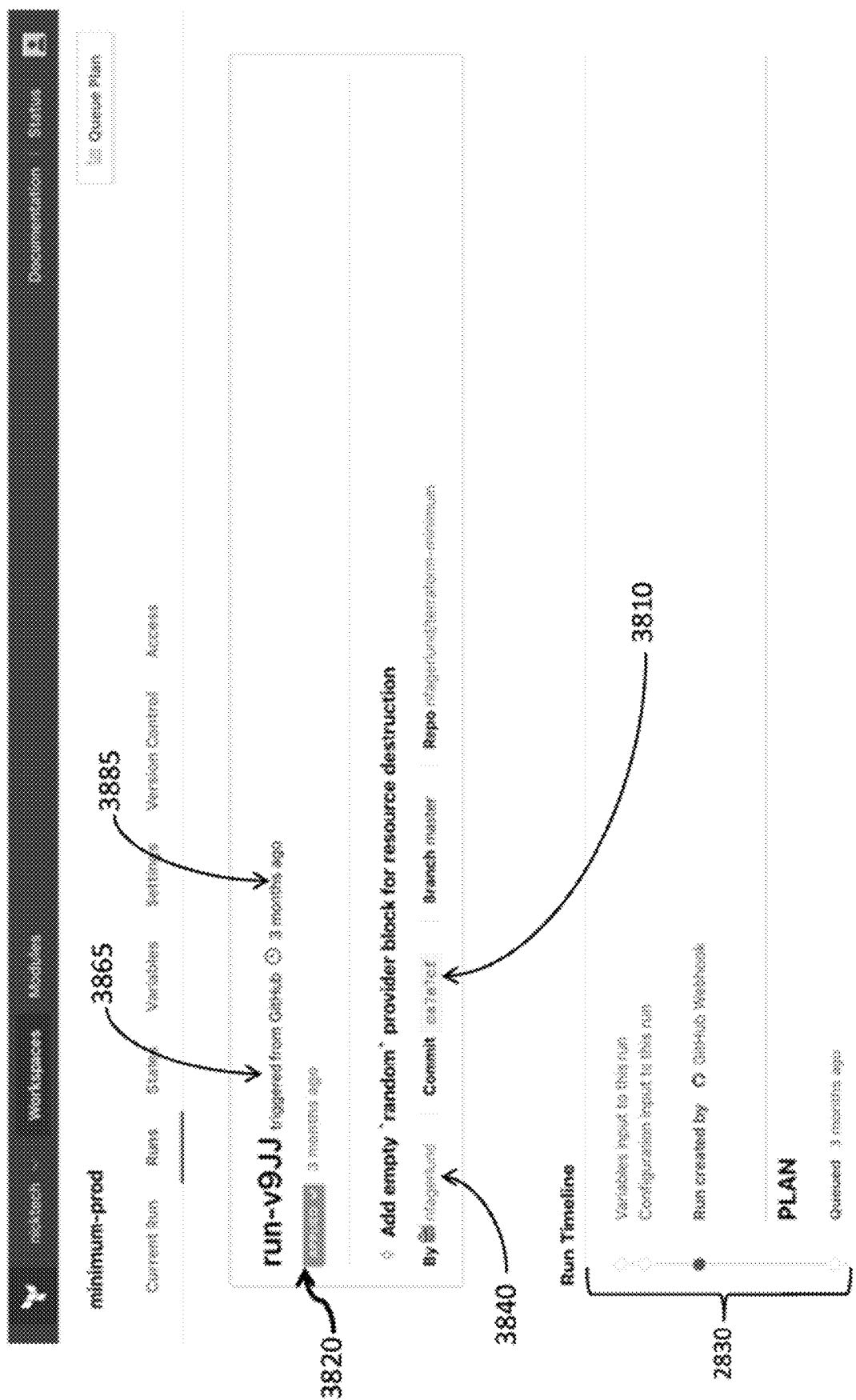
FIG. 6B depicts an example of a user interface for interacting with runs within a workspace, in accordance with some example embodiments.
Figure 6C:
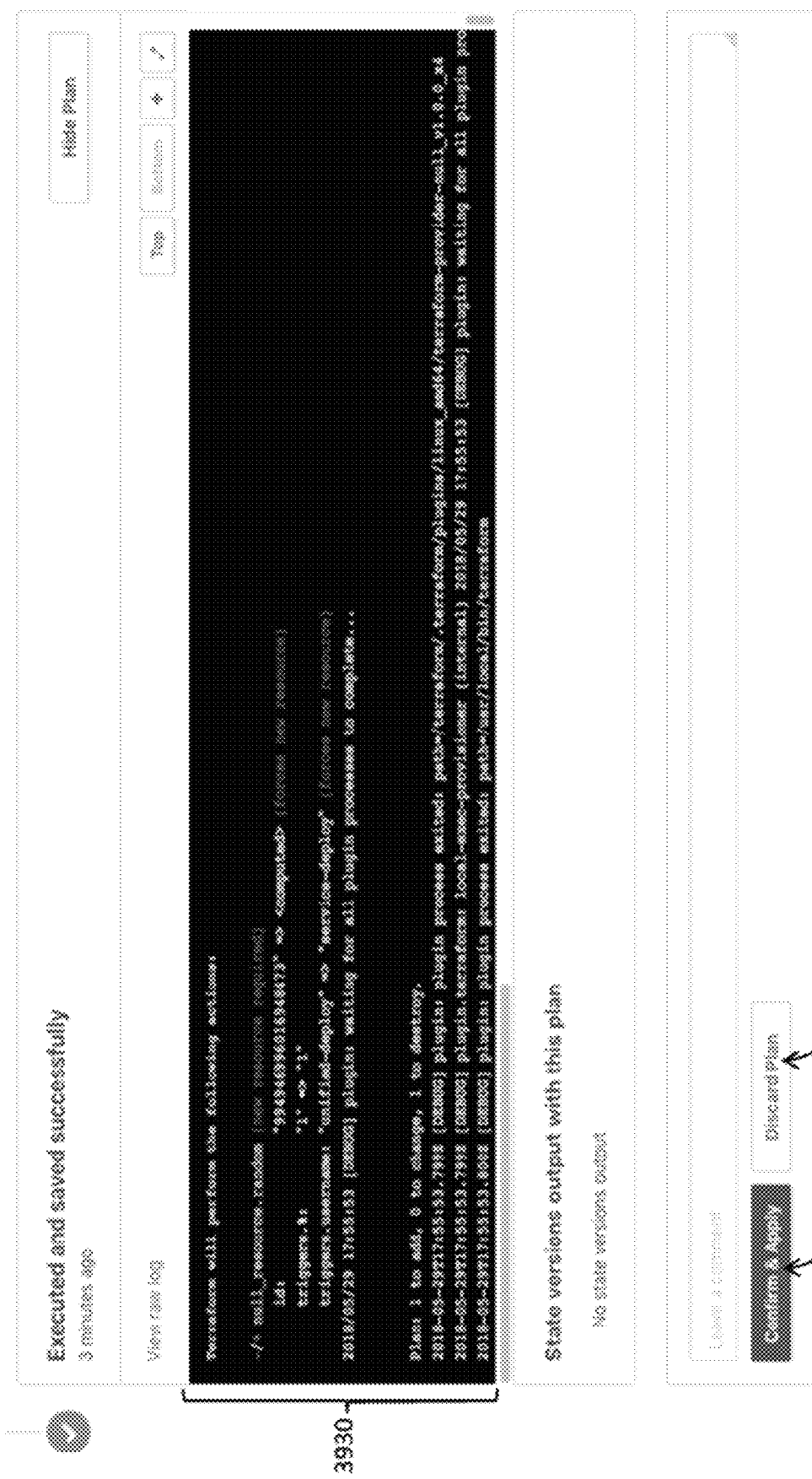
FIG. 6C depicts an example of a user interface for interacting with runs within a workspace, in accordance with some example embodiments.

FIGS. 6A-C depict examples of user interfaces for interacting with runs within a workspace. Referring to FIG. 6A, all runs of the execution plan 190 may be performed within at least one workspace such as, for example, the first workspace 165a, the second workspace 165b, and/or the third workspace 165c. The first workspace 165a, the second workspace 165b, and/or the third workspace 165c may provide the state 526, the variables 3750, and the variables 3760 required for the run. The first workspace 165a, the second workspace 165b, and/or the third workspace 165c may further specify the sources 810 and 820 of the configuration. Each workspace may include a button 3755 to start a run, a link 3765 to the full list of runs, and a link 3775 to the most recent active run or the last completed run. It should be appreciated that the most recent active run may not be the most recently initiated run because pending runs may remain inactive until the completion of a current run. Runs may be processed one at a time in order and only one active run may be permitted for each workspace. Whenever a new run is initiated, the run may be added to an end of a run queue. When a run in progress, the new run may be held in abeyance until the current run is complete.

The runs page may display the run name 3720, the identity of the user who initiated the run 3710, and the source of the run start 3730 (e.g., version controller 140, the information technology infrastructure controller 110, and/or the like). The run page may also display the name of the branch 3770, the code commit for the run 3760, and the status of the run 3750. As noted, a run may be started via the information technology infrastructure controller 110 or the version controller 140. Alternatively, a run may also be created via a command line interface (CLI) and initiated via a user interface. When a run is initiated, the information technology infrastructure controller 110 may lock the run, for example, to the first configuration file 125a. Any subsequent changes, for example, from the second configuration file 125b, may apply to future runs but not the runs that are already in progress (e.g., pending, planning, or awaiting to be applied to the information technology infrastructure 130).

The information technology infrastructure controller 110 may be configured to initiate a run for the execution plan 190 automatically. Whenever a new commit is detected at the version controller 140, the information technology infrastructure controller 110 may respond by queuing a corresponding plan. The first user 145a and/or the second user 145b may also queue a plan, for example, after editing one or more variables associated with the first workspace 165a, the second workspace 165b, and/or the third workspace 165c. Each run of a plan may pass through several stages of action including, for example, pending, planning, policy checking, applying, complete, and/or the like. The information technology infrastructure controller 110 may be configured to provide an indication of the status of each run. For example, in the list of workspaces, each workspace may be shown with the status of a current run and/or the most recently completed run.

FIG. 6B depicts an individual run page configured to display the progress and outcomes of each stage of a run. The run page may show a current status of the run 3820, the code commit associated with the run 3810, the manner in which the run was initiated 3865, when the run was initiated 3885, the user 3840 initiating the run, a timeline of events related to the run, the output 3930 from the plan, and/or the like.

Where a user has sufficient access privileges (e.g., write access) to a workspace, the run page may provide controls for interacting with a run while the run is in progress. For example, the run may be cancelled while the run is in progress or the execution plan 190 may be discarded before the execution plan 190 is applied during the run. One or more of the first policy 175a, the second policy 175b, first quota 175c, and/or the second quota 175d may also be overridden and thus excluded from the validation of the execution plan 190. A user with sufficient access privileges (e.g., write access or administrative access) to the workspace may temporarily suspend the queuing of runs by at least locking the workspace. New runs may remain in a pending state until the workspace is unlocked.

Current and historical state data for a workspace may be viewed from a "states" tab. Each state in the list may be associated with a run and/or a commit to the version controller 140. Each state in the list may be further associated with a link to a raw state file and a delta file storing one or more differences between a current state and a previous state. A given workspace may access state data for workspaces within the same organization (e.g., the first workspace 165a, the second workspace 165b, and/or the third workspace 165c associated with the organization 155). In some example embodiments, outputs from other workspaces may be accessed remotely, for example, by being added as a data source in the first configuration file 125a and/or the second configuration file.

In some example embodiments, the information technology infrastructure controller 110 may generate a token (e.g., an application programming interface (API) token) that is unique to each run. The token may be exported to the shell environment. Moreover, the token may be used to read and/or write state data for the workspace associated with the run as well as to read state data from any other workspace in the same organization 155. However, a token may become invalid after a corresponding run is complete.

Figure 7:
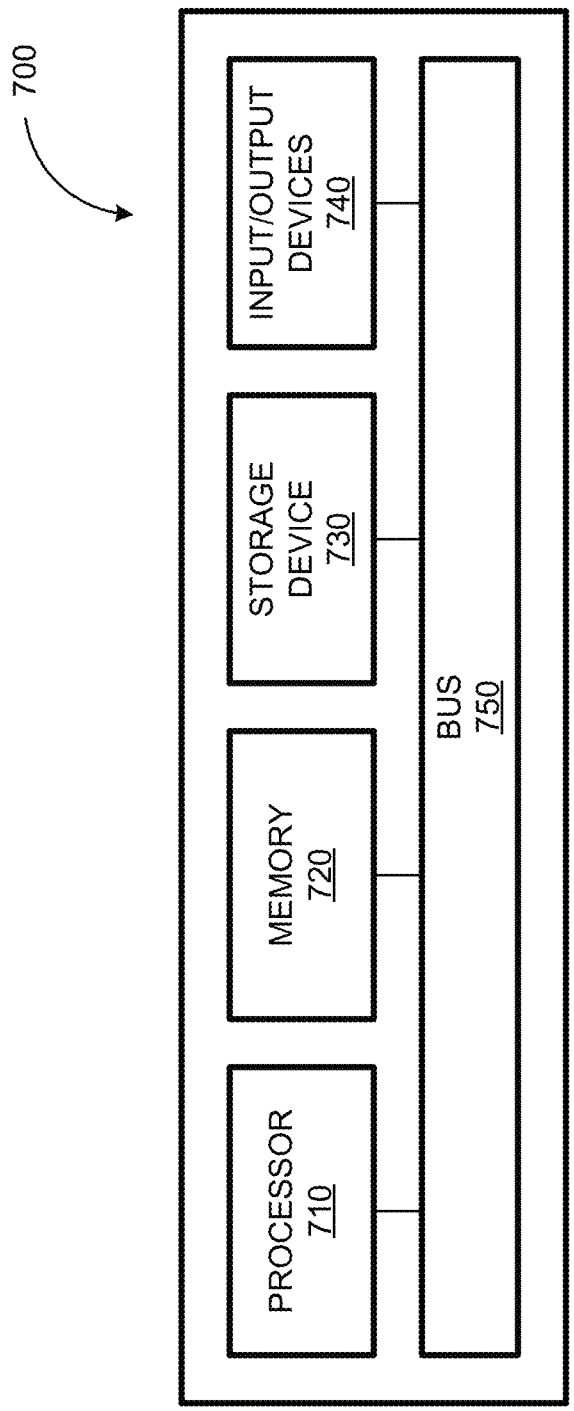
FIG. 7 depicts a block diagram illustrating a computing system consistent with implementations of the current subject matter.

FIG. 7 depicts a block diagram illustrating a computing system 700 consistent with implementations of the current subject matter. Referring to FIGS. 1A-C and 7, the computing system 700 can be used to implement the information technology infrastructure controller 110 and/or any components therein.

As shown in FIG. 7, the computing system 700 can include a processor 710, a memory 720, a storage device 730, and input/output device 740. The processor 710, the memory 720, the storage device 730, and the input/output device 740 can be interconnected via a system bus 750. The processor 710 is capable of processing instructions for execution within the computing system 700. Such executed instructions can implement one or more components of, for example, the information technology infrastructure controller 110. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, a tape device, a solid state device, and/or any other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include users and servers. A user and server are generally remote from each other and typically interact through a communication network. The relationship of user and server arises by virtue of computer programs running on the respective computers and having a user-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein.

Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A system, comprising:
    at least one data processor; and
    at least one memory storing instructions which, when executed by the at least one data processor, result in operations comprising:
        receiving, from a first client, a first indication to publish a first infrastructure module, the first infrastructure module comprising a first set of configurations to apply to an information technology infrastructure;
        responding to the first indication by at least storing, in a module registry, the first infrastructure module;
        receiving, from a second client, a second indication selecting the first infrastructure module; and
        responding to the second indication by at least sending, from the module registry to the second client, the first infrastructure module for insertion into a configuration file being created at the second client, the insertion of the first infrastructure module incorporating, into the configuration file, the first set of configurations to apply to the information technology infrastructure.

2. The system of claim 1, further comprising:
    responding to the first indication by registering, at a version controller, a webhook configured to post a notification in response to a first version of the first infrastructure module and/or a second version of the first infrastructure module being committed to the version controller.

3. The system of claim 2, further comprising:
    responding to the notification by at least pulling, from the version controller, the first version of the first infrastructure module and/or the second version of the first infrastructure module.

4. The system of claim 1, further comprising:
    generating a user interface configured to display, at the second client, a selection of infrastructure modules for insertion into the configuration file, the selection of infrastructure modules including the first infrastructure module, and the selection of infrastructure modules further including a second infrastructure module that comprises a second set of configurations to apply to the information technology infrastructure.

5. The system of claim 4, wherein a second user at the second client interacts with the user interface to merge, into a workspace, the configuration file including the first infrastructure module, the workspace being configured to maintain a plurality of configurations to apply to the information technology infrastructure, and the merging of the configuration file into the workspace incorporates, into the plurality of configurations maintained by the workspace, the first set of configurations associated with the first infrastructure module.

6. The system of claim 5, further comprising:
    in response to the configuration file being merged into the workspace, sending, to the first client, a third indication of the first infrastructure module being used in the workspace.

7. The system of claim 4, wherein the selection of infrastructure modules further includes a first version of the first infrastructure module and a second version of the first infrastructure module, and wherein the second indication from the second user further selects the first version of the first infrastructure module or the second version of the first infrastructure module for insertion into the configuration file.

8. The system of claim 4, further comprising:
    receiving, from the second user at the second client, a third indication selecting the second infrastructure module; and
    responding to the third indication by at least sending, to the second client, the second infrastructure module for insertion into the configuration file being created at the second client, the insertion of the second infrastructure module incorporating, into the configuration file, the second set of configurations to apply to the information technology infrastructure.

9. The system of claim 1, wherein the configuration file includes a programming code-based representation of one or more resources at the information technology infrastructure.

10. The system of claim 1, wherein applying the first set of configurations at the information technology infrastructure includes provisioning, modifying, and/or de-provisioning one or more resources at the information technology infrastructure.

11. The system of claim 1, wherein applying the first set of configurations at the information technology infrastructure at least a partially achieves a predefined information technology objective comprising one or more of support for a software application, a multi-tier software application, self-service clusters, a software demonstration, a disposable environment, software defined networking, a resource scheduler, and/or a multi-cloud deployment.

12. The system of claim 1, wherein the module registry is associated with an organization, and wherein the module registry is accessible to a first user and a second user based at least on the first user and the second user being associated with the organization.

13. The system of claim 1, wherein the module registry is accessible to a first user but not a second user based at least on a role and/or a permission associated with each of the first user and/or the second user.

14. A computer-implemented method, comprising:
    receiving, from a first client, a first indication from a first user to publish a first infrastructure module, the first infrastructure module comprising a first set of configurations to apply to an information technology infrastructure;
    responding to the first indication by at least storing, in a module registry, the first infrastructure module;
    receiving, from a second client, a second indication from a second user selecting the first infrastructure module; and
    responding to the second indication by at least sending, from the module registry to the second client, the first infrastructure module for insertion into a configuration file being created at the second client, the insertion of the first infrastructure module incorporating, into configuration file, the first set of configurations to apply to the information technology infrastructure.

15. The method of claim 14, further comprising:
responding to the first indication by registering, at a version controller, a webhook configured to post a notification in response to a first version of the first infrastructure module and/or a second version of the first infrastructure module being committed to the version controller.

16. The method of claim 15, further comprising:
responding to the notification by at least pulling, from the version controller, the first version of the first infrastructure module and/or the second version of the first infrastructure module.

17. The method of claim 14, further comprising:
generating a user interface configured to display, at the second client, a selection of infrastructure modules for insertion into the configuration file, the selection of infrastructure modules including the first infrastructure module, and the selection of infrastructure modules further including a second infrastructure module that comprises a second set of configurations to apply to the information technology infrastructure.

18. The method of claim 17, wherein the second user at the second client interacts with the user interface to merge, into a workspace, the configuration file including the first infrastructure module, the workspace being configured to maintain a plurality of configurations to apply to the information technology infrastructure, and the merging of the configuration file into the workspace incorporates, into the plurality of configurations maintained by the workspace, the first set of configurations associated with the first infrastructure module.

19. The method of claim 18, further comprising:
in response to the configuration file being merged into the workspace, sending, to the first client, a third indication of the first infrastructure module being used in the workspace.

20. The method of claim 17, wherein the selection of infrastructure modules further includes a first version of the first infrastructure module and a second version of the first infrastructure module, and wherein the second indication from the second user further selects the first version of the first infrastructure module or the second version of the first infrastructure module for insertion into the configuration file.

21. The method of claim 17, further comprising:
receiving, from the second user at the second client, a third indication selecting the second infrastructure module; and responding to the third indication by at least sending, to the second client, the second infrastructure module for insertion into the configuration file being created at the second client, the insertion of the second infrastructure module incorporating, into configuration file, the second set of configurations to apply to the information technology infrastructure.

22. The method of claim 14, wherein the configuration file includes a programming code-based representation of one or more resources at the information technology infrastructure.

23. The method of claim 14, wherein applying the first set of configurations at the information technology infrastructure includes provisioning, modifying, and/or de-provisioning one or more resources at the information technology infrastructure.

24. The method of claim 14, wherein applying the first set of configurations at the information technology infrastructure at least a partially achieves a predefined information technology objective comprising one or more of support for a software application, a multi-tier software application, self-service clusters, a software demonstration, a disposable environment, software defined networking, a resource scheduler, and/or a multi-cloud deployment.

25. The method of claim 14, wherein the module registry is associated with an organization, and wherein the module registry is accessible to the first user and the second user based at least on the first user and the second user being associated with the organization.

26. The method of claim 14, wherein the module registry is accessible to the first user but not the second user based at least on a role and/or a permission associated with each of the first user and/or the second user.

27. A non-transitory computer readable medium storing instructions, which when executed by at least one data processor, result in operations comprising:
receiving, from a first client, a first indication from a first user to publish a first infrastructure module, the first infrastructure module comprising a first set of configurations to apply to an information technology infrastructure;
responding to the first indication by at least storing, in a module registry, the first infrastructure module;
receiving, from a second client, a second indication from a second user selecting the first infrastructure module; and
responding to the second indication by at least sending, from the module registry to the second client, the first infrastructure module for insertion into a configuration file being created at the second client, the insertion of the first infrastructure module incorporating, into the configuration file, the first set of configurations to apply to the information technology infrastructure.

* * * * *